US009800436B2

(12) United States Patent
Sakai

(10) Patent No.: US 9,800,436 B2
(45) Date of Patent: Oct. 24, 2017

(54) RECEIVER AND CONTROL METHOD FOR RECEIVER

(71) Applicant: FUJITSU LIMITED, Kawasaki-shi, Kanagawa (JP)

(72) Inventor: Yasufumi Sakai, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/363,266

(22) Filed: Nov. 29, 2016

(65) Prior Publication Data

US 2017/0187552 A1 Jun. 29, 2017

(30) Foreign Application Priority Data

Dec. 25, 2015 (JP) ................. 2015-253427

(51) Int. Cl.
*H03H 7/30* (2006.01)
*H04L 25/03* (2006.01)
*H04B 1/16* (2006.01)

(52) U.S. Cl.
CPC ......... *H04L 25/03057* (2013.01); *H04B 1/16* (2013.01)

(58) Field of Classification Search
CPC .......... H04L 27/01; H04L 2025/03363; H04L 25/03267; H04L 2025/03414;
(Continued)

(56) References Cited

U.S. PATENT DOCUMENTS

2004/0062319 A1* 4/2004 Casper ................ H04L 25/4917
375/286
2009/0238301 A1 9/2009 Cheung

FOREIGN PATENT DOCUMENTS

JP 2009-231954 10/2009

OTHER PUBLICATIONS

Peter Park, "A 4PAM/2PAM coaxial cable receiver analog front-end targeting 40Gb/s in 90-nm CMOS", A thesis submitted in conformity with the requirements for the degree of Master of Applied Science Graduate Department of Electrical and Computer Engineering University of Toronto, Jul. 30, 2008.

(Continued)

*Primary Examiner* — Rahel Guarino
(74) *Attorney, Agent, or Firm* — Staas & Halsey LLP

(57) ABSTRACT

A receiver includes: a frequency-characteristic-changing-circuit to change a frequency characteristic of an input signal in which N-level data value is pulse-amplitude-modulated, to generate a frequency-characteristic-changed-signal; a controller to control the frequency-characteristic-changing-circuit to obtain a desired ratio between a amplitude component of a target data value corresponding to the frequency-characteristic-changed-signal at a first timing and a second amplitude component thereof at a second timing which is later than the first timing; and a decision-feedback-equalization-circuit to which the frequency-characteristic-changed-signal is input, wherein the decision-feedback-equalization-circuit includes: a comparison-circuit to include comparators each to output a comparison result obtained from comparing the target data value and a threshold value, and N−1 selection circuits each to select one of comparison results output from the comparators at the second timing, based on the comparison results, and wherein at least one of the comparators outputs the comparison results to two of the N−1 selection circuits.

10 Claims, 28 Drawing Sheets

(58) Field of Classification Search
CPC ..... H04L 2025/03808; H04L 25/03878; H04L 2027/004; H04B 1/719; H04B 1/1027; H04Q 2213/03
USPC ........ 375/233, 346, 353, 286; 455/63.1, 296
See application file for complete search history.

(56) References Cited

OTHER PUBLICATIONS

Tracy et al., "Evolution of System Electrical Interfaces Towards 400G Transport", Optical Internetworking Forum (OIF), Sep. 23, 2013.

\* cited by examiner

| IN | OUT | | |
|---|---|---|---|
| | s1 | s2 | s3 |
| 3 | 1 | 1 | 1 |
| 2 | -1 | 1 | 1 |
| 1 | -1 | -1 | 1 |
| 0 | -1 | -1 | -1 |

RECEIVER AND CONTROL METHOD FOR RECEIVER

CROSS-REFERENCE TO RELATED APPLICATION

This application is based upon and claims the benefit of priority from the prior Japanese Patent Application No. 2015-253427, filed on Dec. 25, 2015, the entire contents of which are incorporated herein by reference.

FIELD

The embodiments discussed herein are related to a receiver and a control method for the receiver.

BACKGROUND

Recently, the performance of a component such as a CPU constituting an information processing system (e.g., a server or a computer), especially, the bandwidth that can be processed by a signal of the component has been largely improved. Hence, a high speed performance of a transmission/reception circuit conducting data transmission/reception among a plurality of elements or circuit blocks between the chips such as the CPUs and inside a chip is required to improve the total bandwidth of the entire information processing system. Further, the high speed performance is also required for a transmission/reception circuit conducting data transmission/reception among boards or housings. In the transmission/reception circuit conducting the high speed data communication, a signal equalizing circuit (equalizer) is used to compensate for a data signal deterioration occurring in a communication channel.

An example of the equalizer is a speculative type decision feedback equalizer (DFE). The DFE assigns an offset voltage corresponding to a signal deterioration caused by an inter-symbol interference (ISI) occurring due to past data, to a data signal before being determined in a comparator, so as to compensate for the signal deterioration caused by the ISI. In the DFE, since a data signal is required to be compensated for each bit, a selection circuit (MUX) selecting a comparison result of the comparator is required to select a signal per time of a 1 bit width of data (1 unit interval (UI)). Accordingly, a delay time of a signal route for controlling the selection circuit is required to be shorter than the time of the 1 UI of data.

In the speculative type decision feedback equalization circuit, signals are assigned in advance with offset voltages corresponding to the possible kinds of data values, and a signal assigned with an offset voltage corresponding to the data that has been determined at the time of data determination is selected. Thus, the time required for the offset voltage assigning process may be reduced, as compared to assigning an offset voltage after the data decision.

Related techniques are disclosed in, for example, Japanese Laid-Open Patent Publication No. 2009-231954, Peter Park, "A 4PAM/2PAM coaxial cable receiver analog front-end targeting 40 Gb/s in 90-nm CMOS," a thesis submitted in conformity with the requirements for the degree of Master of Applied Science Graduate Department of Electrical and Computer Engineering in the University of Toronto, Jul. 30, 2008, and Optical Internetworking Forum (OIF), "Evolution of System Electrical Interfaces Towards 400G Transport," [searched on Nov. 28, 2015], Internet <URL: http://www.oi-forum.com/public/documents/30921b_Combined_Mkt_Focus_ECOC_Panel_OIF.pdf>.

SUMMARY

According to an aspect of the invention, a receiver includes: a frequency characteristic changing circuit configured to change a frequency characteristic of an input signal in which N-level data value is pulse-amplitude-modulated, to generate a frequency characteristic changed signal, wherein the N is an integer of 4 or more; a controller configured to include at least a processor configured to control the frequency characteristic changing circuit to obtain a desired ratio between a first amplitude component of a target data value corresponding to the frequency characteristic changed signal at a first timing and a second amplitude component of the target data value at a second timing which is later than the first timing; and a first decision feedback equalization circuit to which the frequency characteristic changed signal is input, wherein the first decision feedback equalization circuit includes: a first comparison circuit configured to include a plurality of first comparators each to output a first comparison result obtained from comparing the target data value and a threshold value, and first N−1 selection circuits each configured to select one of first comparison results output from the plurality of first comparators at the second timing, based on the first comparison results, and wherein at least one of the plurality of first comparators outputs the first comparison results to two of the first N−1 selection circuits.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In order to implement a data communication at a relatively higher data rate, standards have been established for a data communication by 4-level pulse amplitude modulation (PAM), which is called PAM4, instead of a 2-level modulation transmission method such as non-return to zero (NRZ).

When the 4- or more level pulse amplitude modulation is used, the number of the ISIs that may possibly occur increases, as compared to that in the NRZ case, and hence, the number of comparison circuits used for the speculative DFE largely increases, as compared to the NRZ case. When the number of the comparison circuits used for the speculative DFE increases, the power consumption of the comparison circuits and the power consumption of the circuits driving the comparison circuits may increase.

Hereinafter, a technology which is capable of suppressing the increase of the number of the comparison circuits used for the decision feedback equalization circuit will be described with reference to the accompanying drawings. However, the technological scope of the present disclosure is not limited to the embodiments described below.

A receiver according to an embodiment enables a comparison result of at least one comparison circuit of a DFE to be used in two selection circuits, by adjusting a ratio between a main cursor and a first post cursor of an input signal in which a 4- or more level data value is pulse-amplitude-modulated. In the receiver according to the embodiment, a comparison result of at least one comparison circuit of the DFE may be used in two selection circuits so that the number of the comparison circuits may be reduced, and the power consumption of the receiver may be reduced.

First Embodiment

Figure 1:
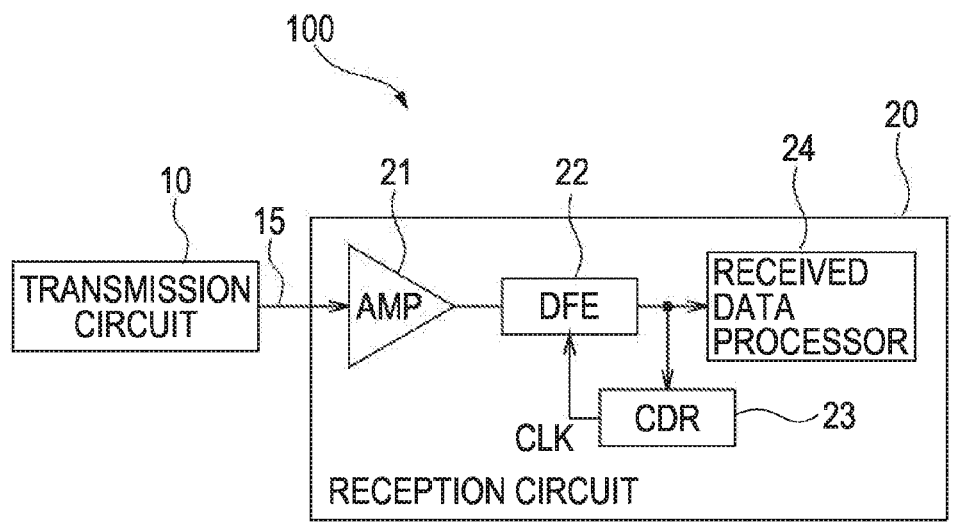
FIG. 1 is a view illustrating an exemplary configuration of a communication system installed, for example, between chips and inside a chip.

FIG. 1 is a view illustrating an exemplary configuration of a communication system.

A communication system 100 includes a transmission circuit 10, a transmission route 10, and a reception circuit 20. The communication system 100 is installed, for example, between chips and inside a chip. For example, the transmission circuit 10 makes a parallel to serial conversion on the transmission data, and then, outputs the data to the transmission route 15 in synchronization with a transmission clock. The reception circuit 20 receives the data signal transmitted from the transmission route 15.

The reception circuit 20 includes a preamplifier (AMP) 21 that amplifies the data signal input from the transmission route 15, a decision feedback equalization (DFE) circuit 22, a clock data recovery (CDR) circuit 23, and a received data processor 24. The DFE 22 includes comparators (comparison circuits) therein and assigns an offset voltage corresponding to a signal deterioration caused by an ISI occurring due to past data, to a data signal before being determined in the comparators, so as to compensate for the signal deterioration caused by the ISI. The CDR circuit 23 recovers a transmission clock from a changing edge of the received data as output by the DFE 22. The received data processor 24 is an internal circuit that processes the received data as output by the DFE 22. A demultiplexer that makes a serial to parallel conversion on the received data is installed in the DFE 22, but may be installed in the received data processor 24 as well. Here, descriptions will be made assuming that the demultiplexer is installed at the output stage of the DFE 22.

Figure 2:
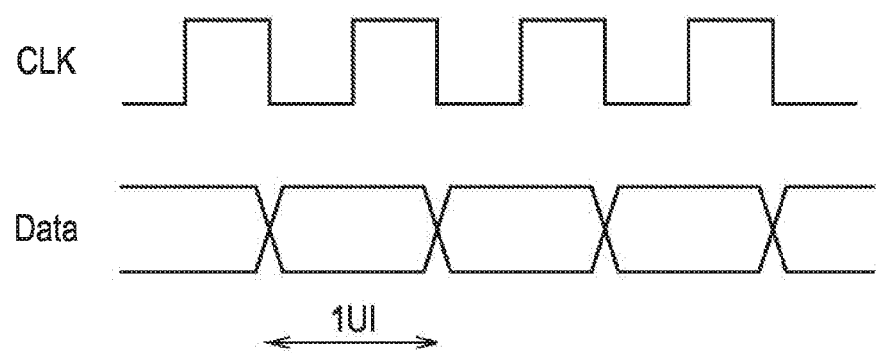
FIG. 2 is a time chart illustrating a phase relationship between a reception clock recovered by clock data recovery (CDR) and a received data signal from a preamplifier (AMP), in a decision feedback equalizer (DFE)

FIG. 2 is a time chart illustrating a phase relationship between a reception clock CLK recovered by the CDR 23 and a received data signal from the AMP 21, in the DFE circuit 22. FIG. 2 is an example of a so-called full rate in which the received data signal changes in one cycle of the reception clock CLK, and the change cycle of the received data signal, i.e., one cycle of the CLK corresponds to 1 UI.

Figure 3:
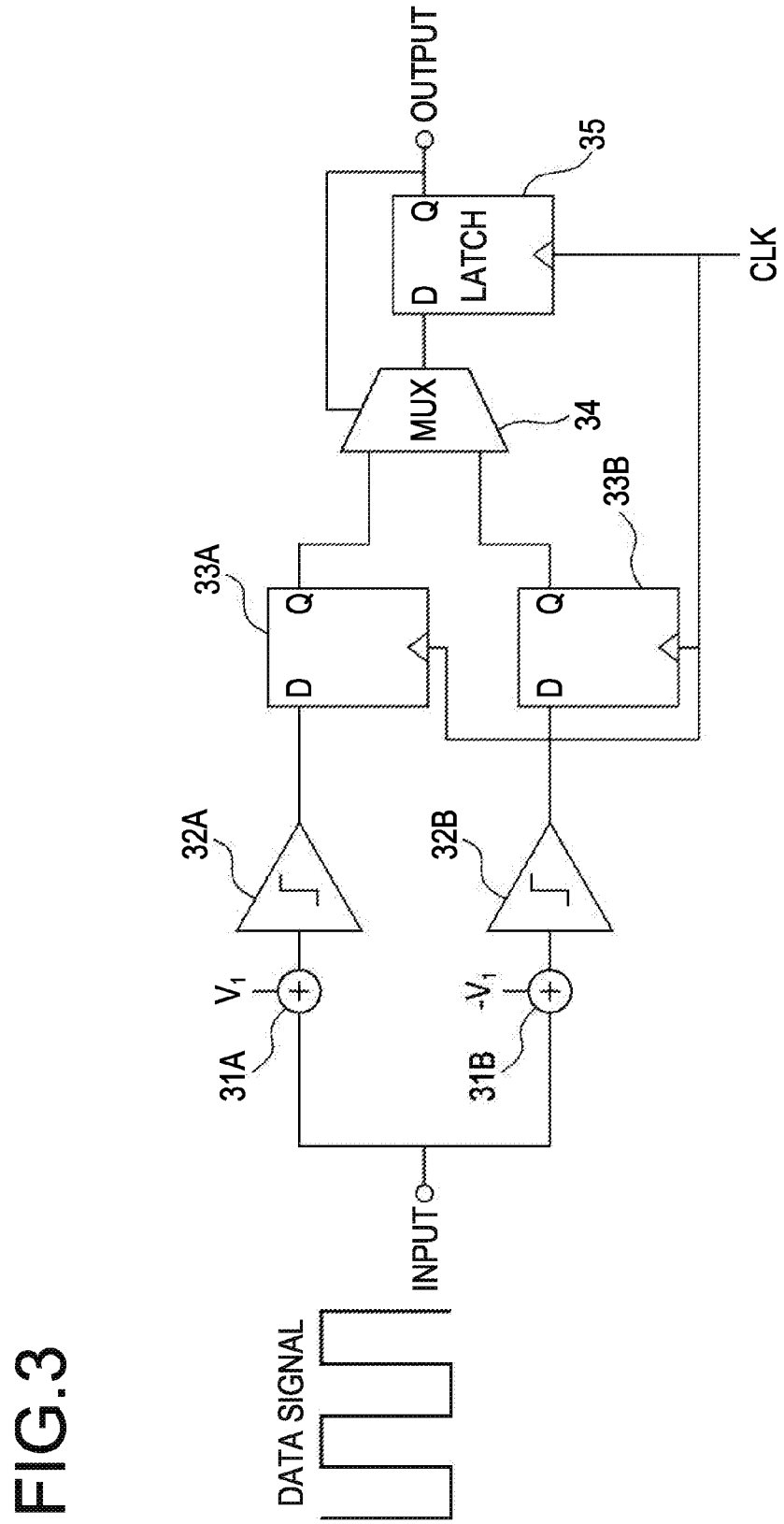
FIG. 3 is a view illustrating an exemplary configuration of a 2-level modulation speculative decision feedback equalizing circuit.

FIG. 3 is a view illustrating an exemplary configuration of a 2-level modulation speculative decision feedback equalization circuit.

The DFE includes two adder circuits 31A and 31B, two comparators (comparison circuits) 32A and 32B, two latch circuits FF 33A and 33B, a selection circuit (MUX) 34, and a latch circuit 35. The adder circuit 31A applies an offset voltage $V_1$ to the received data signal, and the adder circuit 31B applies an offset voltage $-V_1$ to the received data signal. The comparator 32A compares the received data signal to which the offset voltage $V_1$ output by the adder circuit 31A has been applied, with a reference voltage, and outputs "0" or "1" as a result of the comparison. The comparator 32B compares the received data signal to which the offset voltage $-V_1$ output by the adder circuit 31B has been applied, with the reference voltage, and outputs "0" or "1" as a result of the comparison. The latch circuit 33A receives and holds the output of the comparator 32A in synchronization with rising edge of the reception clock CLK. The latch circuit 33B receives and holds the output of the comparator 32B in synchronization with the rising edge of the reception clock CLK. The selection circuit 34 selects one of the outputs of the latch circuit 33A and the latch circuit 33B depending on an output of the latch circuit 35. The latch circuit 35 receives and holds the output of the selection circuit 34 in synchronization with the rising edge of the reception clock CLK.

As illustrated in FIG. 3, since the latch circuits 33A, 33B, and 35 receive and hold the inputs in synchronization with the rising edge of the reception clock CLK, the output of the latch circuit 35 is data obtained by delaying one of the outputs of the latch circuits 33A and 33B by 1 UI. That is, the output of the latch circuit 35 is data that precedes one of the outputs of the latch circuits 33A and 33B by one bit.

Figure 4:
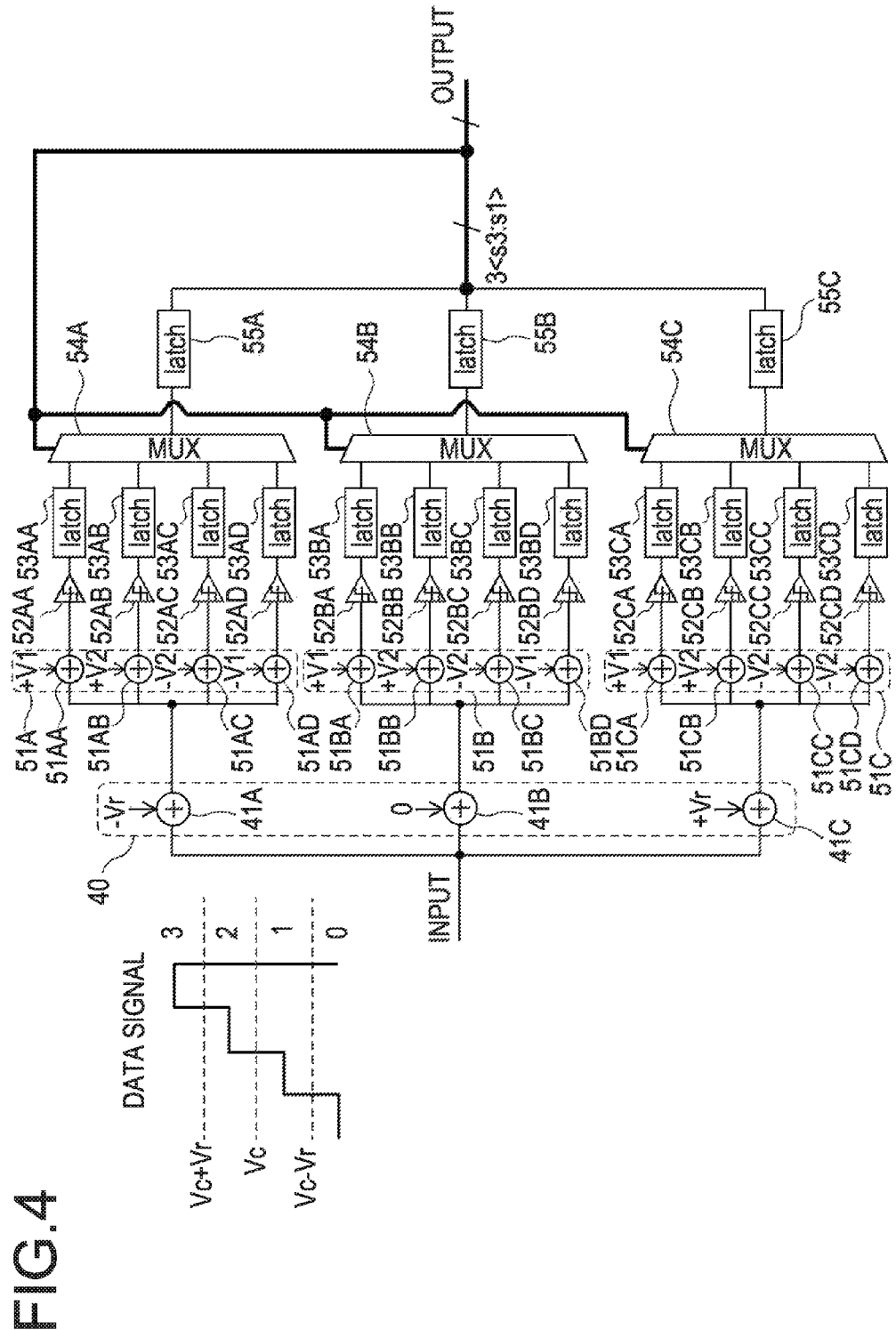
FIG. 4 is a view illustrating an exemplary configuration of a 4-level modulation speculative decision feedback equalizing circuit.

FIG. 4 is a view illustrating an exemplary configuration of a 4-level modulation speculative decision feedback equalization circuit.

The DFE of FIG. 4 receives a 4-level modulated signal representing data which is 4-level-modulated by pulse amplitude modulation (PAM4). The 4-level modulated signal takes data values of the four levels of "0" to "3." A determination of "0" or "1" is performed by applying a shift voltage of Vc−Vr. A determination of "1" or "2" is performed by applying a shift voltage of Vc. A determination of "2" or "3" is performed by applying a shift voltage of Vc+Vr.

This DFE includes a level conversion circuit 40, three sets of decision feedback equalization correction circuits 51A to 51C, 3×4 comparators 52AA to 52CD, 3×4 first latch circuits 53AA to 53CD, and three selection circuits 54A to 54C. The DFE further includes three second latch circuits 55A to 55C. The level conversion circuit 40, the decision feedback equalization correction circuits 51A to 51C, the comparators 52AA to 52CD, and the first latch circuits 53AA to 53CD form a comparison unit including a plurality of comparison circuits each outputting a comparison result obtained by comparing a target data value and a threshold with each other. In addition, the MUXs 54A to 54C select one of the comparison results output from the plurality of comparison circuits, respectively.

The level conversion circuit 40 includes first to third level conversion circuits 41A to 41C, and each of the first to third level conversion circuits 41A to 41C includes an adder circuit. The first level conversion circuit 41A generates a first shift signal by applying a shift voltage of −Vr to the received data signal. The second level conversion circuit 41B generates a second shift signal by applying a shift voltage of 0 V to the received data signal, that is, without applying a voltage. The third level conversion circuit 41C generates a third shift signal by applying a shift voltage of +Vr to the received data signal.

The first decision feedback equalization correction circuit 51A includes four adder circuits 51AA to 51AD. The adder circuits 51AA to 51AD perform a decision feedback equalization process for applying each of offset voltages of +V1, +V2, −V2, and −V1 to the output of the first level conversion circuit 41A so as to generate four equalization correction signals. The second decision feedback equalization correction circuit 51B and the third decision feedback equalization correction circuit 51C have the same configuration as that of the first decision feedback equalization correction circuit 51A. The second decision feedback equalization correction circuit 51B performs the decision feedback equalization process for the output of the second level conversion circuit 41B. The third decision feedback equalization correction circuit 51C performs the decision feedback equalization process for the output of the third level conversion circuit 41C.

The four comparators 52AA to 52AD compare the outputs of the four adder circuits 51AA to 5AD with the reference voltage and output "1" when each output is larger than the reference voltage and "0" when each output is smaller than the reference voltage. The four comparators 52BA to 52BD and the four comparators 52CA to 52CD compare the outputs of the four adder circuits 51BA to 51BD and the outputs of the adder circuits 51CA to 51CD, respectively, with the reference voltage.

The four first latch circuits 53AA to 53AD receive and hold the outputs of the four comparators 52AA to 52AD, in the rising edge of the CLK. The four second latch circuits 53BA to 53BD receive and hold the outputs of the four comparators 52BA to 52BD, in the rising edge of the CLK. The four third latch circuits 53CA to 53CD receive and hold the outputs of the four comparators 52CA to 52CD, in the rising edge of the CLK.

The MUX 54A selects the outputs of the four first latch circuits 53AA to 53AD depending on the outputs of the three second latch circuits 55A to 55C. Specifically, the MUX 54A latches the output of the first latch circuit 53AA when values of the 1 UI-preceding received data as output by the three second latch circuits 55A to 55C are "3." Likewise, the MUX 54A latches the outputs of the first latch circuit 53AB, the first latch circuit 53AC, and the first latch circuit 53AD when the values of the 1 UI-preceding received data are "2," "1," and "0," respectively. Likewise, the MUXs 54B and 54C select the outputs of the second latch circuits 53BA to 53BD and the outputs of the third latch circuits 53CA to 53 CD, respectively, depending on outputs of the three second latch circuits 55A to 55C.

The three second latch circuits 55A to 55C receive and hold the outputs of the MUXs 54A to 54C, in the rising edge of the CLK.

Figures 5, 6:
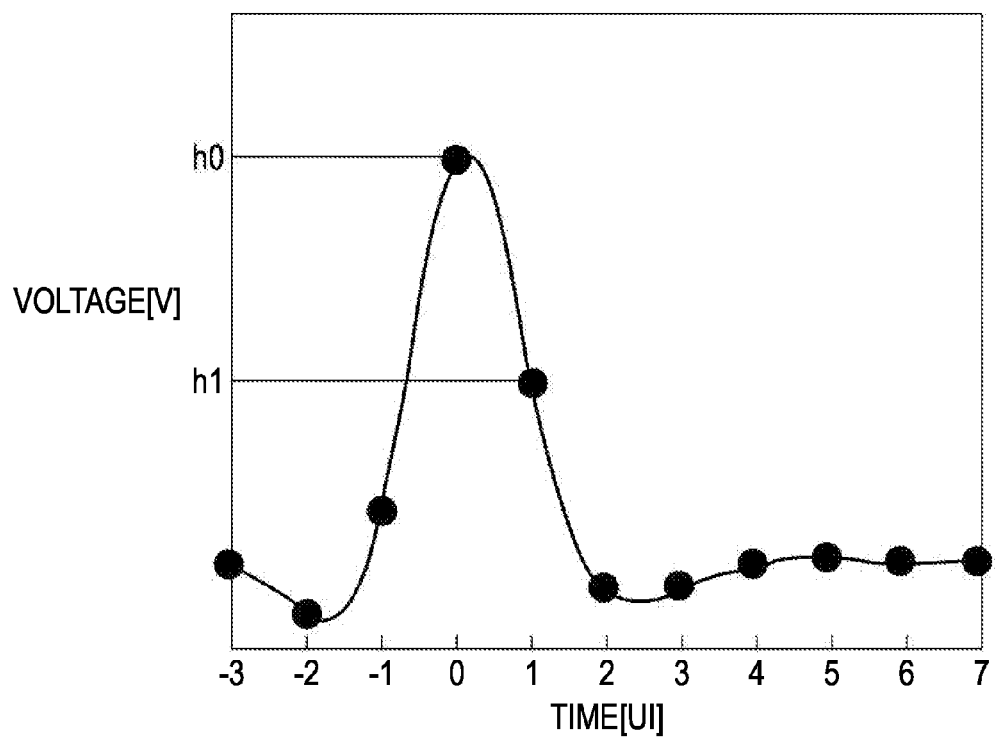
FIG. 5 is a view illustrating a relationship between a 4-level modulated signal to be input and an output signal.
FIG. 6 is a view illustrating exemplary inter-symbol interference (ISI)

FIG. 5 is a view illustrating a relationship between an input 4-level signal and an output signal <s3:s1> of each of the three second latch circuits 55A to 55C.

When a data value of an input signal IN indicates "3," all the signals s1 to s3 are "1." When the data value of the input signal IN indicates "2," the signal s1 is "−1," and the signals s2 and s3 are "1." When the data value of the input signal IN indicates "1," the signals s1 and s2 are "−1," and the signal s3 is "1." When the data value of the input signal IN indicates "0," all the signals s1 to s3 are "−1."

FIG. 6 is a view illustrating an exemplary ISI. In FIG. 6, the horizontal axis represents time [UI], and the vertical axis represents a voltage [V]. FIG. 6 represents an exemplary ISI occurring in a case of input of a unit pulse signal in which a data value is "0" until −1 [UI], shifts into "3" at 0 [UI], further shifts into "0" at 1 [UI], and thereafter, becomes "0."

In FIG. 6, h0 is a main cursor of the signal shifting into "3" at 0 [UI], and h1 is a first post cursor of the signal shifting into "3" at 0 [UI]. The main cursor represents an amplitude component of a target data value corresponding to the 4-level modulated signal at a predetermined timing, and the first post cursor represents an amplitude component of a target data value after 1 [UI] from the predetermined timing.

Figure 7:
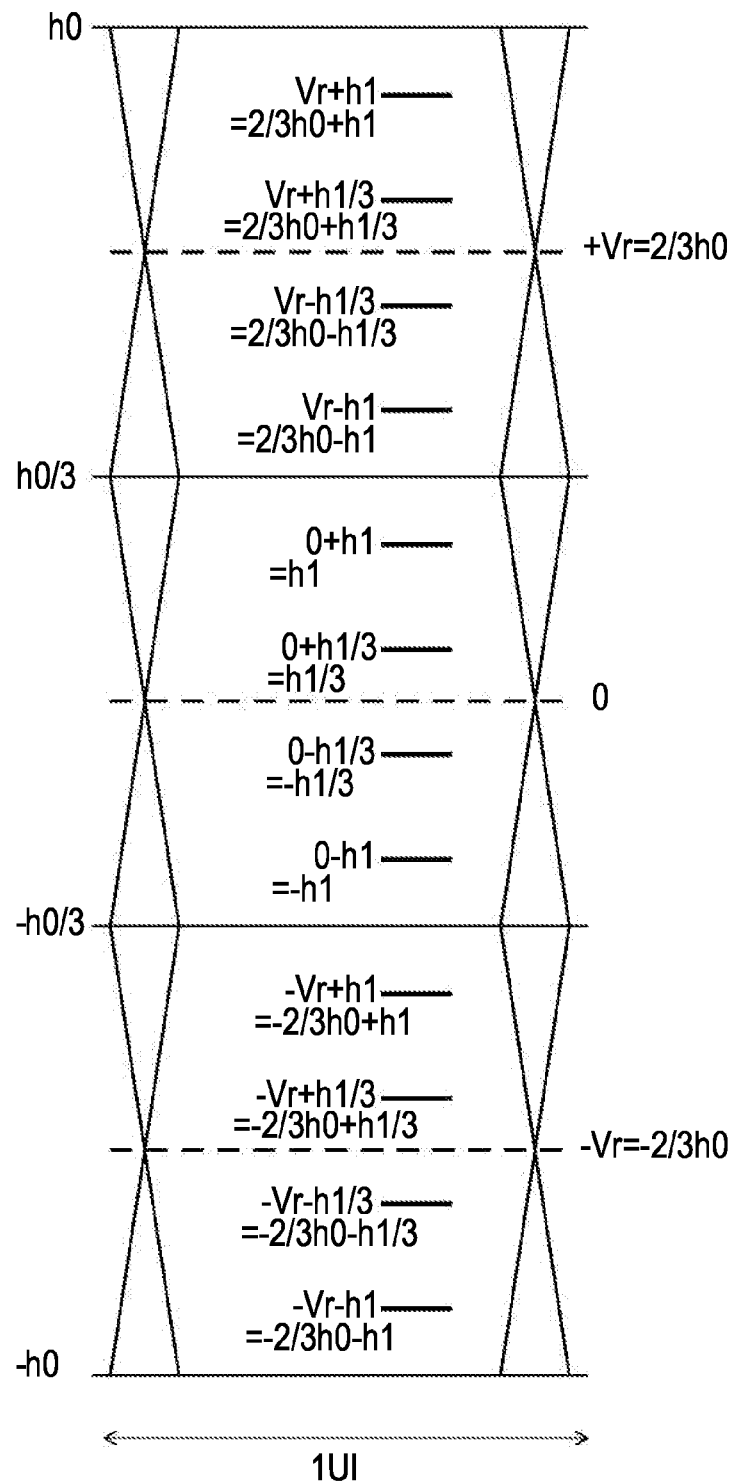
FIG. 7 is a view illustrating an exemplary relationship between an eye pattern of an input signal IN and thresholds of 12 comparators in a 1 UI time period.

FIG. 7 is a view illustrating an exemplary relationship between an eye pattern of the input signal IN and thresholds of the 12 comparators 52AA to 52CD in the 1 UI time period. In FIG. 7, the amplitude of the input signal IN is h0, and Vc is 0V. When the data value of the input signal IN is "0," the input signal IN is −h0 [V]. When the data value of the input signal IN is "1," the input signal IN is −h0/3 [V]. When the data value of the input signal IN is "2," the input signal IN is h0/3 [V]. When the data value of the input signal IN is "3," the input signal IN is h0 [V].

The thresholds of the first latch circuits 53AA to 53AD are Vr+h1, Vr+h1/3, Vr−h1/3, and Vr−h1, respectively. Since Vr is ⅔h0, the thresholds of the first latch circuits 53AA to 53AD are ⅔h0+h1, ⅔h0+h1/3, ⅔h0−h1/3, and ⅔h0−h1, respectively.

Since the thresholds of the second latch circuits 53BA to 53BD are 0+h1, 0+h1/3, 0−h1/3, and 0−h1, respectively, the thresholds become h1, h1/3, −h1/3, and −h1, respectively.

The thresholds of the third latch circuits 53CA to 53CD are −Vr+h1, −Vr+h1/3, −Vr−h1/3, and −Vr−h1, respectively. Since −Vr is −⅔h0, the thresholds of the third latch circuits 53CA to 53CD are −⅔h0+h1, −⅔h0+h1/3, −⅔h0−h1/3, and −⅔h0−h1, respectively.

Figure 8:
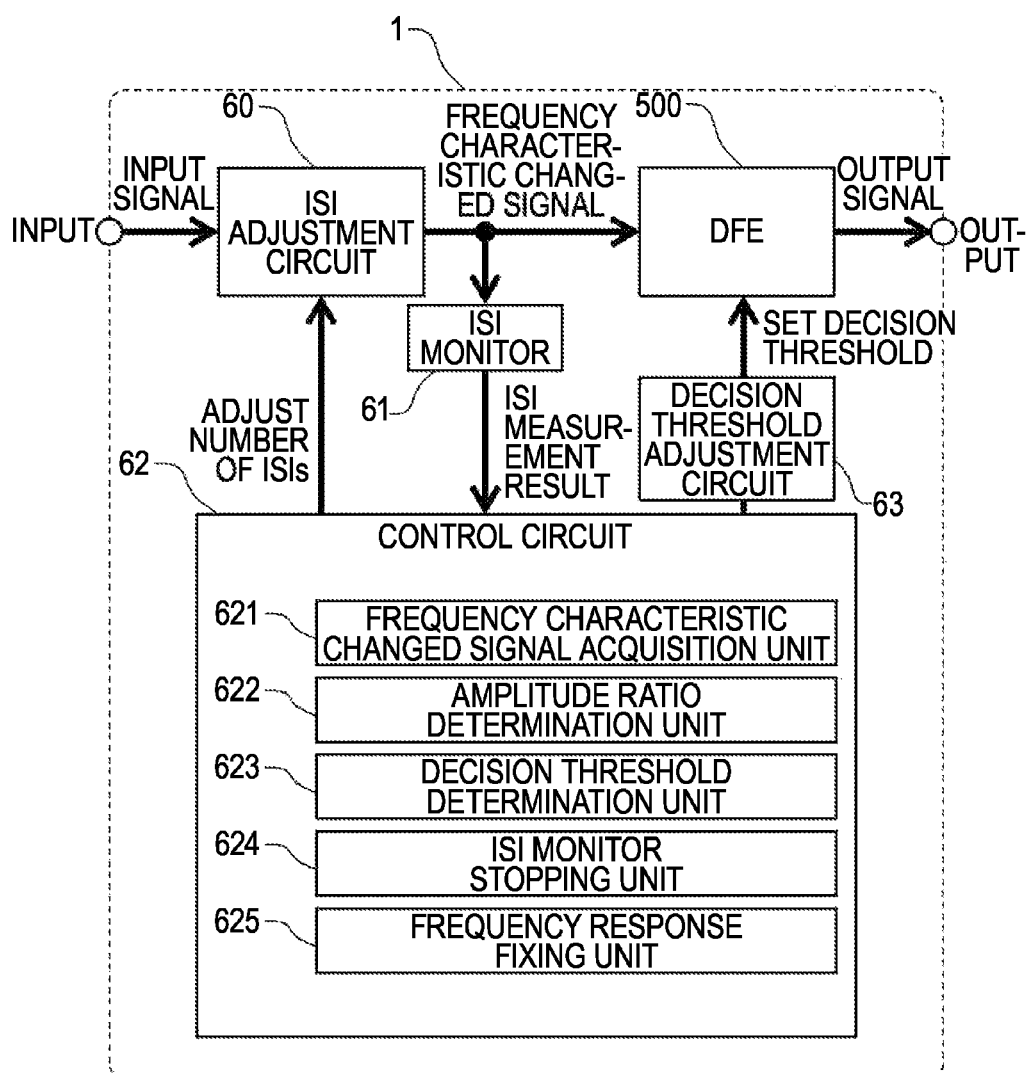
FIG. 8 is a view illustrating a receiver according to a first embodiment.

FIG. 8 is a view illustrating a receiver according to the first embodiment.

The receiver 1 includes a DFE 500, an ISI adjustment circuit 60, an ISI monitor 61, a control circuit 62, and a decision threshold adjustment circuit 63.

The ISI adjustment circuit 60 is, for example, a frequency characteristic changing circuit that changes a frequency characteristic of a signal input to the receiver 1, i.e., the 4-level modulated signal in which the 4-level data value is pulse-amplitude-modulated, so as to generate a frequency characteristic changed signal. The ISI monitor 61 measures the waveform of the frequency characteristic changed signal of which the frequency characteristic has been changed by the ISI adjustment circuit 60. The control circuit 62 includes at least a processor to actualize functions of a frequency characteristic changed signal acquisition unit 621, an amplitude ratio determination unit 622, a decision threshold determination unit 623, an ISI monitor stopping unit 624, and a frequency response fixing unit 625. The control circuit 62 controls the ISI adjustment circuit 60 to obtain a desired ratio between a first amplitude component representing a target data value of a frequency characteristic changed signal at a first timing and a second amplitude component representing a target data value of the same at a second timing which is later than the first timing. The first timing is a timing for acquiring the main cursor h0 of the target data value, and the second timing is a timing for acquiring the first post cursor h1 of the target data value. The main cursor h0 is a main amplitude component of the input signal which represents a current bit, and the first post cursor h1 is an amplitude component of the input signal which represents a bit preceding 1 bit delayed by 1 UI due to the ISI. The decision threshold adjustment circuit 63 outputs the thresholds according to the amplitude of the frequency characteristic changed signal at the first and second timings as measured by the ISI monitor 61, to the DFE 500.

Figure 9:
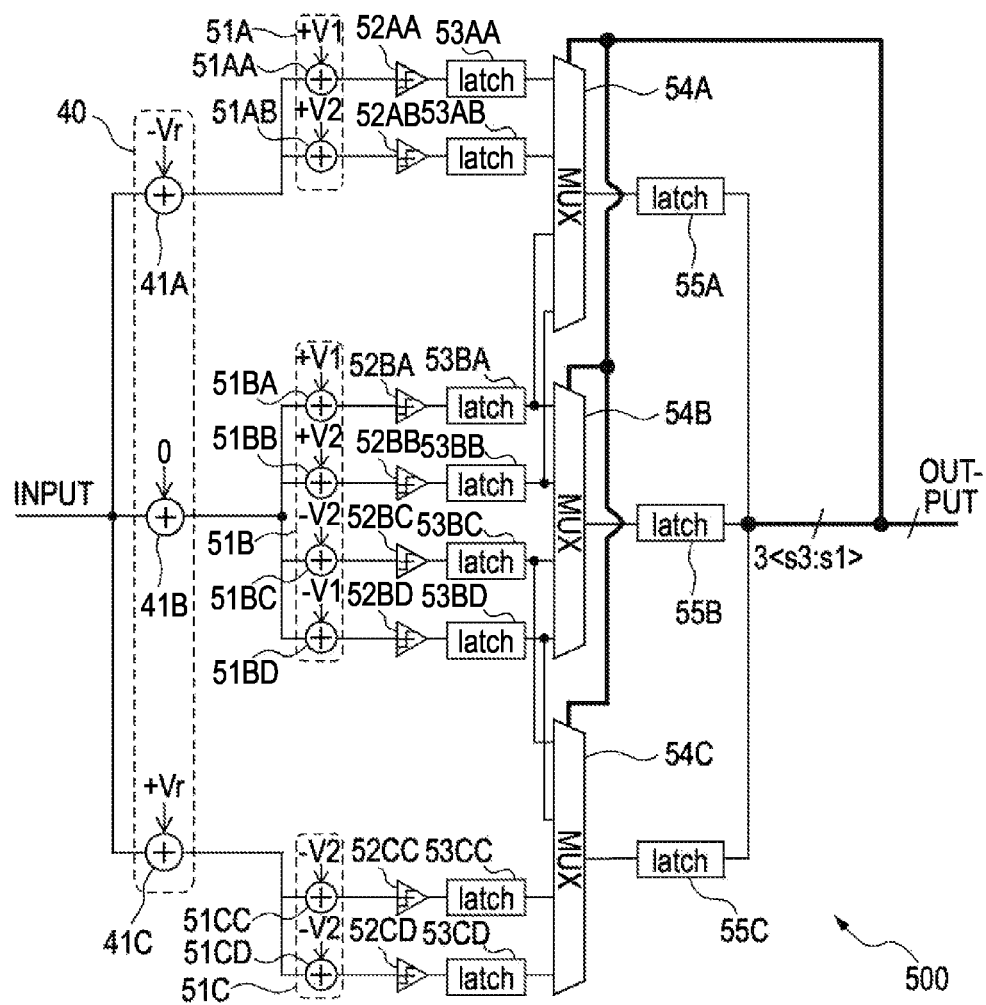
FIG. 9 is an internal circuit block diagram of a DFE illustrated in FIG. 8.

FIG. 9 is an internal circuit block diagram of the DFE 500.

The DFE 500 is different from the DFE illustrated in FIG. 4 in that the DFE 500 does not include the adder circuits 51AC and 51AD, the comparators 52AC and 52AD, and the first latch circuits 53AC and 53AD of the first decision feedback equalization correction circuit 51A. Further, the DFE 500 is different from the DFE illustrated in FIG. 4 in that the DFE 500 does not include the adder circuits 51CA and 51CB, the comparators 52CA and 52CB, and the first latch circuits 53CA and 53CB of the third decision feedback equalization correction circuit 51C. Further, the DFE 500 is different from the DFE illustrated in FIG. 4 in that in the DFE 500, the second latch circuits 53BA and 53BB are connected to the MUX 55A, and the second latch circuits 53BC and 53BD are connected to the MUX 55C. Since the configurations and the functions of the elements of the DFE 500 are identical to the configurations and the functions of the elements of the DFE illustrated in FIG. 4 which are denoted by the same reference numerals as those of the DFE 500, detailed descriptions thereof will be omitted. The level conversion circuit 40, the decision feedback equalization correction circuits 51A to 51C, the comparators 52AA to 52CD, and the first latch circuits 53AA to 53CD form a comparison unit including a plurality of comparison circuits each outputting a comparison result obtained by comparing a target data value and a threshold with each other. In addition, the MUXs 54A to 54C select one of the comparison results output from the plurality of comparison circuits, respectively, based on the comparison results.

Figure 10:
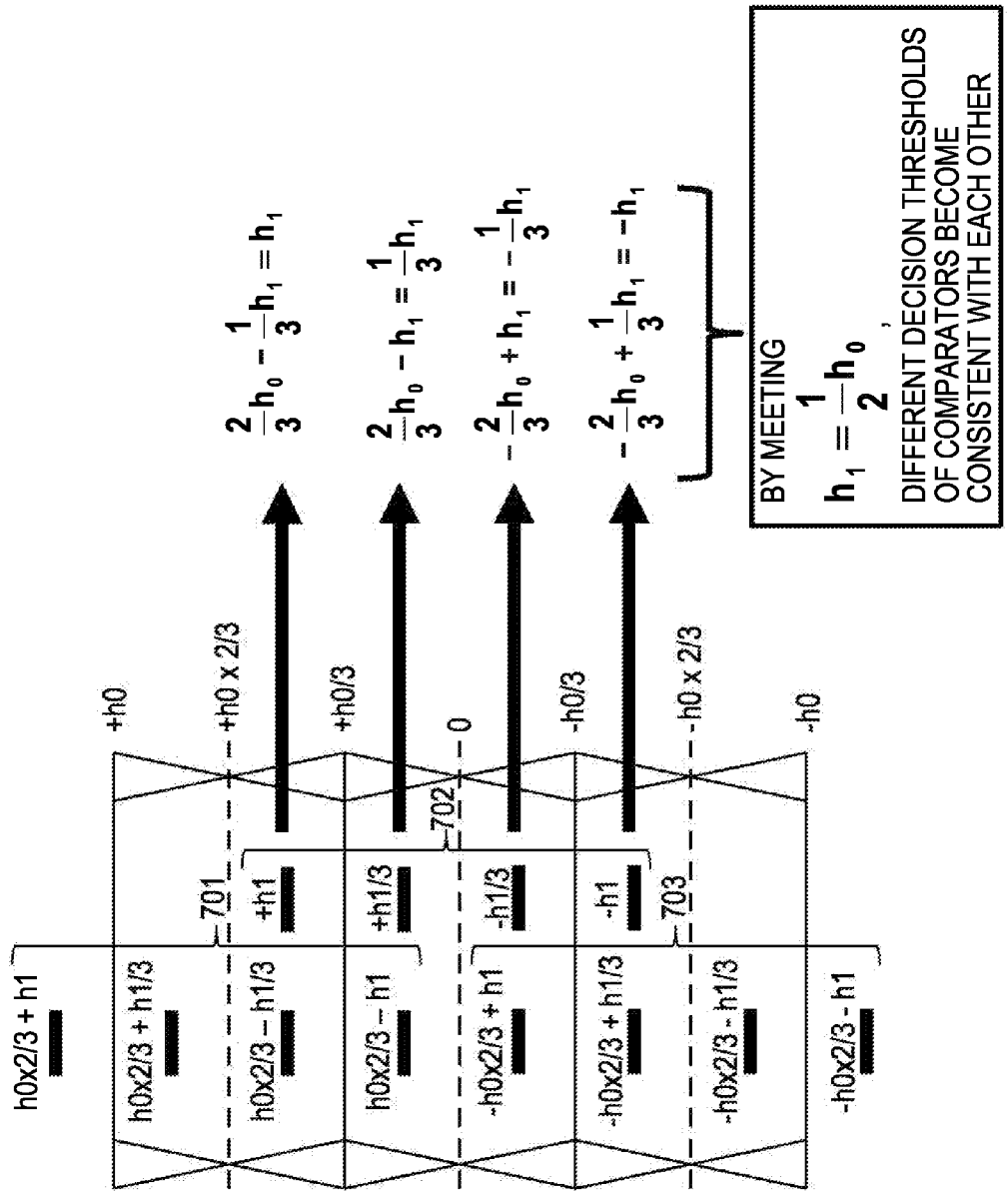
FIG. 10 is a view illustrating an adjustment of a main cursor and a first post cursor by a controller illustrated in FIG. 8.

FIG. 10 is a view illustrating an adjustment of the main cursor h0 and the first post cursor h1 in the control circuit 62. In FIG. 10, a first threshold group 701 represents thresholds corresponding to the thresholds of the first level conversion circuit 41A and the first decision feedback equalization correction circuit 51A. A second threshold group 702 represents thresholds corresponding to the thresholds of the second level conversion circuit 41B and the second decision feedback equalization correction circuit 51B. A third threshold group 703 represents thresholds corresponding to the thresholds of the third level conversion circuit 41C and the third decision feedback equalization correction circuit 51C.

The control circuit 62 adjusts the main cursor h0 and the first post cursor h1 to conform two thresholds of the second threshold group 702 to two thresholds of the first threshold group 701 and the other two thresholds of the second threshold group 702 to two thresholds of the third threshold group 703. When the control circuit 62 conforms two thresholds of the second threshold group 702 to two thresholds of the first threshold group 701, and further, confirms the other two thresholds of the second threshold group 702 to two thresholds of the third threshold group 703, the number of the adder circuits, the comparison circuits, and the latch circuits included in the DFE is reduced. Further, when the number of the adder circuits, the comparison circuits, and the latch circuits included in the DFE is reduced, the power consumption of the DFE is reduced.

More specifically, the control circuit 62 adjusts the main cursor h0 and the first post cursor h1 such that the threshold of the comparator 52AC and the threshold of the comparator 52BA are consistent with each other, and the threshold of the comparator 52AD and the threshold of the comparator 52BB are consistent with each other. In addition, the control circuit 62 adjusts the main cursor h0 and the first post cursor h1 such that the threshold of the comparator 52BC and the threshold of the comparator 52CA are consistent with each other, and the threshold of the comparator 52BD and the threshold of the comparator 52CB are consistent with each other.

The threshold of the comparator 52AC is represented by $$\frac{2}{3}h_0 - \frac{1}{3}h_1 \qquad \text{[Arithmetic Formula 1]}$$

and the threshold of the comparator 52AC is represented as h1. Hence, in order to meet $$\frac{2}{3}h_0 - \frac{1}{3}h_1 = h_1 \qquad \text{[Arithmetic Formula 2]}$$

the control circuit 62 adjusts the main cursor h0 and the first post cursor h1. Likewise, in order to meet $$\frac{2}{3}h_0 - h_1 = \frac{1}{3}h_1$$
$$-\frac{2}{3}h_0 + h_1 = -\frac{1}{3}h_1$$
$$-\frac{2}{3}h_0 + \frac{1}{3}h_1 = -h_1$$

[Arithmetic Formula 3]

the control circuit 62 adjusts the main cursor h0 and the first post cursor h1. That is, in order to meet $$h_1 = \frac{1}{2}h_0$$

[Arithmetic Formula 4]

the control circuit 62 adjusts the main cursor h0 and the first post cursor h1.

Figure 11:
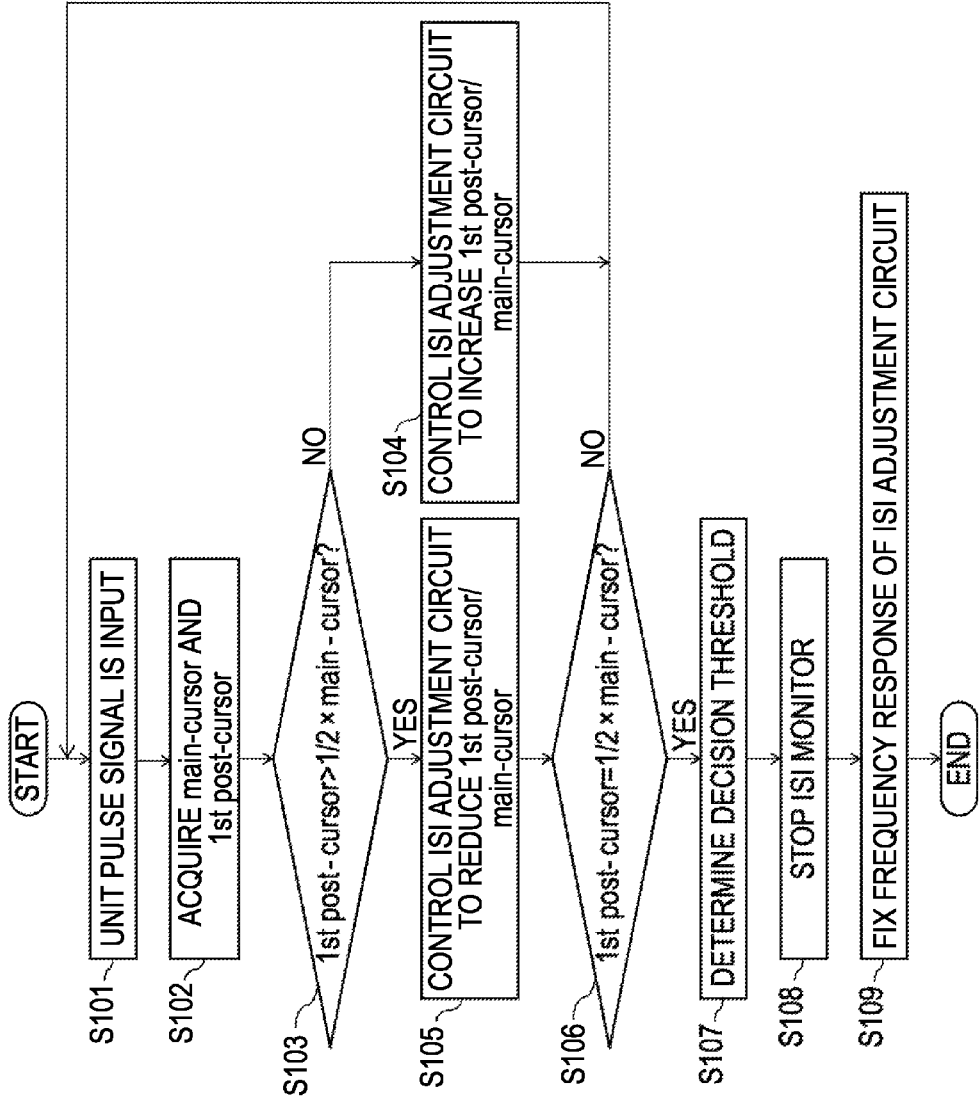
FIG. 11 is a flow chart of an arithmetic processing by the controller illustrated in FIG. 8.

FIG. 11 is a flow chart of an arithmetic processing by the control circuit 62.

First, a unit pulse signal ( . . . 00100 . . . ) is input to the ISI adjustment circuit 60 from an external device (not illustrated) (S101). Subsequently, the frequency characteristic changed signal acquisition unit 621 acquires the main cursor h0 and the first post cursor h1 when the unit pulse signal is input, through the ISI monitor 61 (S102). Subsequently, the amplitude ratio determination unit 622 determines whether the first post cursor h1 is larger than ½ of the main cursor h0 (S103). When it is determined that the first post cursor h1 is equal to or less than ½ of the main cursor h0, the amplitude ratio determination unit 622 adjusts the ISI adjustment circuit 60 to increase the ratio of the first post cursor h1 to the main cursor h0 (S104). In an example, the amplitude ratio determination unit 622 increases a value represented by an adjustment code of the ISI adjustment circuit 60 by one.

The processes of S101 to S104 are repeated so that when it is determined by the amplitude ratio determination unit 622 that the first post cursor h1 is larger than ½ of the main cursor h0 (S103), the process proceeds to S105. In S105, the amplitude ratio determination unit 622 adjusts the ISI adjustment circuit 60 to reduce the ratio of the first post cursor h1 to the main cursor h0 (S104). In an example, the amplitude ratio determination unit 622 reduces the value represented by the adjustment code of the ISI adjustment circuit 60 by one. Subsequently, the amplitude ratio determination unit 622 determines whether the first post cursor h1 and ½ of the main cursor h0 are consistent with each other (S106). In an example, when the process of S104 and the process of S105 are alternately performed three times, the amplitude ratio determination unit 622 determines that the first post cursor h1 and ½ of the main cursor h0 are consistent with each other. When it is determined by the amplitude ratio determination unit 622 that the first post cursor h1 and ½ of the main cursor h0 are inconsistent with each other, the process returns to S101, and the processes of S101 to S106 are repeated.

In S106, when it is determined by the amplitude ratio determination unit 622 that the first post cursor h1 and ½ of the main cursor h0 are consistent with each other, the process proceeds to S107. When it is determined by the amplitude ratio determination unit 622 that the main cursor h0 and the first post cursor h1 are consistent with each other, the decision threshold determination unit 623 determines a threshold according to the main cursor h0 and the first post cursor h1 to be a decision threshold (S107). The decision threshold determination unit 623 outputs a signal representing the main cursor h0 and the first post cursor h1 which correspond to the determined decision threshold, to the decision threshold adjustment circuit 63. The decision threshold adjustment circuit 63 adjusts thresholds of the eight comparators 52AA to 52CD of the DFE 500 to be the threshold according to the main cursor h0 and the first post cursor h1 which correspond to the input signal.

Subsequently, the ISI monitor stopping unit 624 outputs an ISI monitor stop signal representing stopping the waveform measurement of the frequency characteristic changed signal, to the ISI monitor 61 (S108). When the ISI monitor stop signal is input, the ISI monitor 61 stops the waveform measurement of the frequency characteristic changed signal. Then, the frequency response fixing unit 625 outputs a frequency response fixture signal representing fixing a frequency response, to the ISI adjustment circuit 60 (S109). When the frequency response fixing signal is input, the ISI adjustment circuit 60 fixes the frequency response at the time of generating a frequency characteristic changed signal from the input signal.

In the receiver 1, the control circuit 62 adjusts the main cursor h0 and the first post cursor h1 to conform two thresholds of the second threshold group 702 to two thresholds of the first threshold group 701 and the other two thresholds of the second threshold group 702 to two thresholds of the third threshold group 703. When the control circuit 62 adjusts the main cursor h0 and the first post cursor h1 to conform the four thresholds of the second threshold group 702 to two thresholds of the first threshold group 701 and two thresholds of the third threshold group 703, the number of the adder circuits, the comparison circuits, and the latch circuits included in the DFE is reduced. The receiver 1 reduces the number of the adder circuits, the comparison circuits, and the latch circuits included in the DFE thereby reducing the power consumption of the DFE.

Second Embodiment

Figure 12:
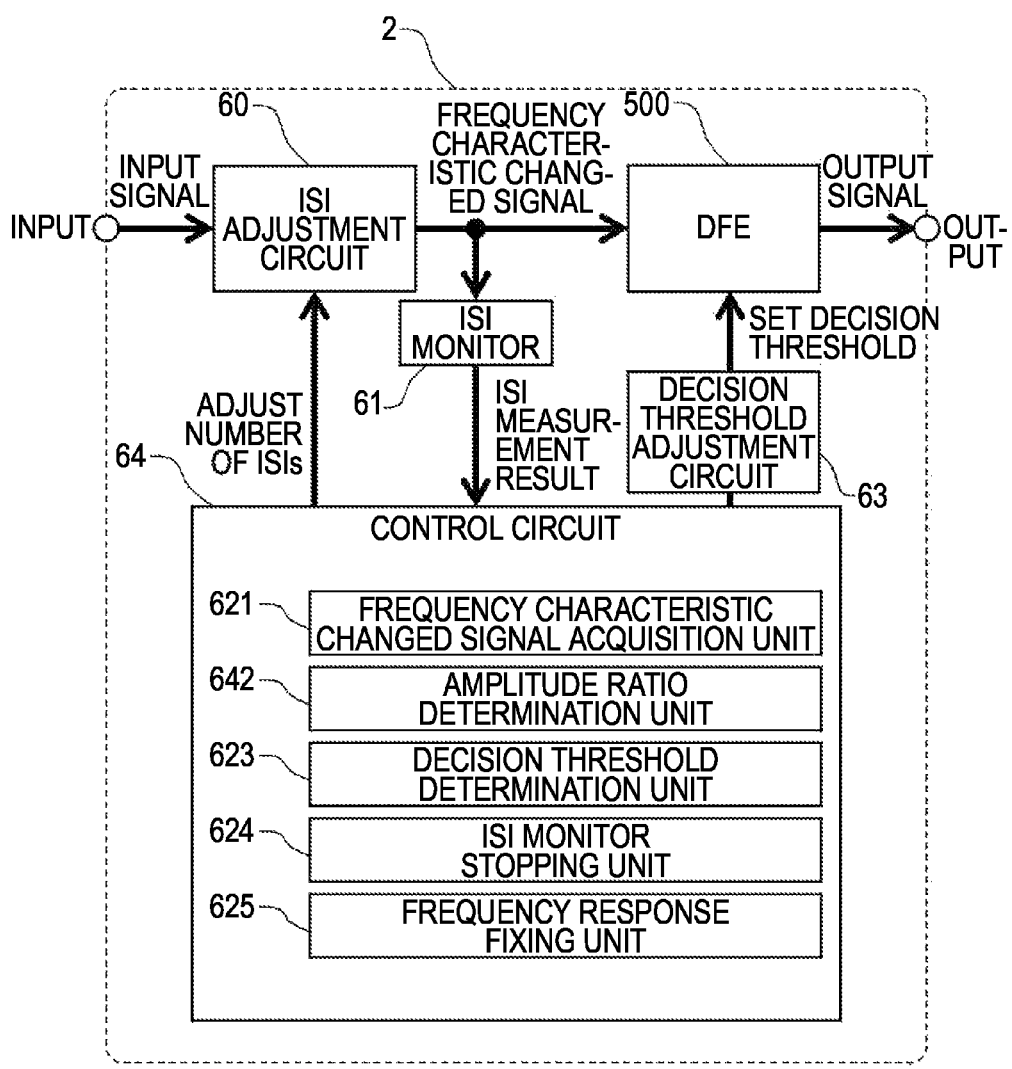
FIG. 12 is a view illustrating a receiver according to a second embodiment.

FIG. 12 is a view illustrating a receiver according to a second embodiment.

The receiver 2 is different from the receiver 1 in that in the receiver 2, a control circuit 64 including an amplitude ratio determination unit 642, instead of the amplitude ratio determination unit 622, is provided, instead of the control circuit 62. The components of the receiver 2 other than the amplitude ratio determination unit 642 have the same configurations and functions as those of the components of the receiver 1 which are denoted by the same reference numerals as used in the receiver 2, detailed descriptions thereof will be omitted.

Figure 13:
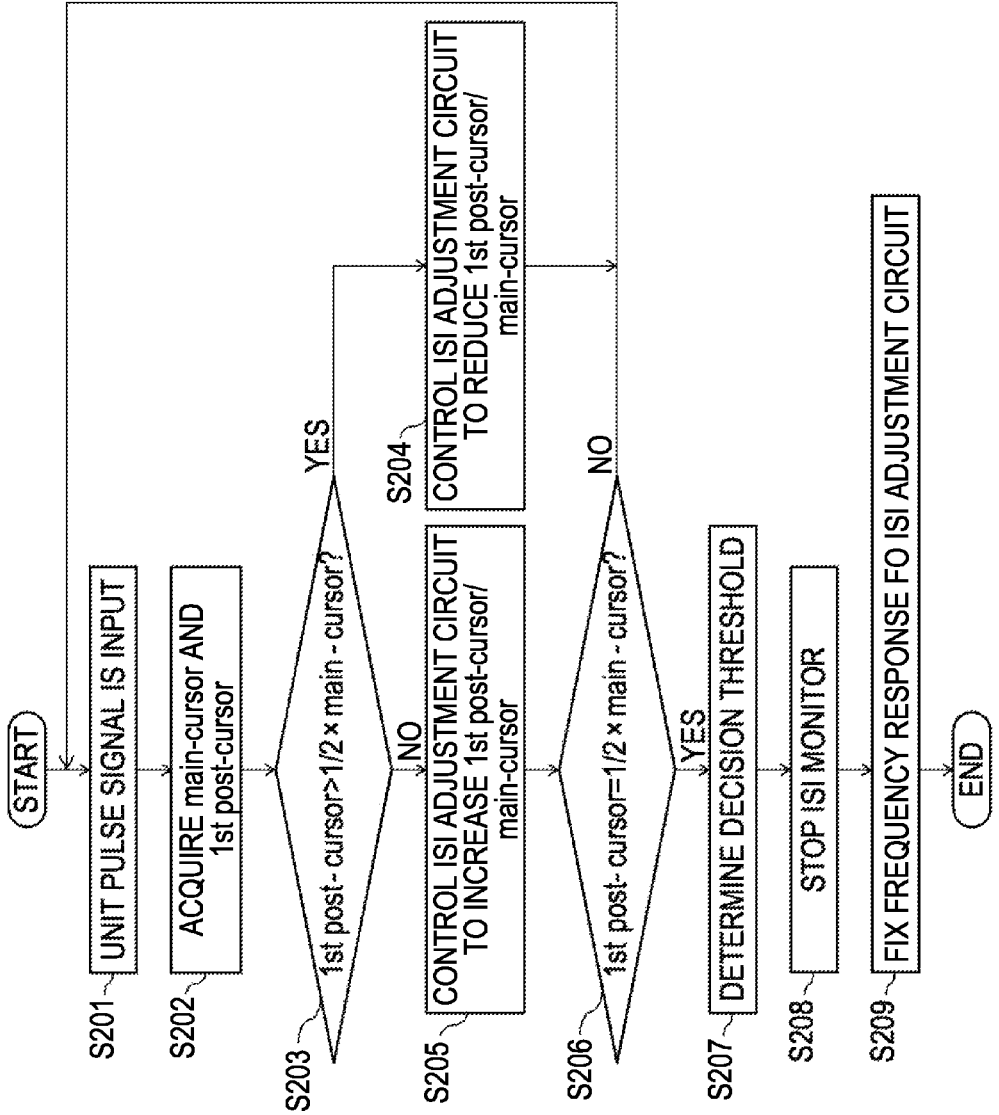
FIG. 13 is a flow chart of an arithmetic processing by a controller illustrated in FIG. 12.

FIG. 13 is a flow chart of an arithmetic processing by the control circuit 64.

Since the processes of S201 to S203 and S206 to S209 illustrated in FIG. 13 are identical to the processes of S101 to S103 and S106 to S109 illustrated in FIG. 11, detailed descriptions thereof will be omitted.

When it is determined that the first post cursor h1 is larger than ½ of the main cursor h0 (S203), the amplitude ratio determination unit 642 adjusts the ISI adjustment circuit 60 to reduce the ratio of the first post cursor h1 to the main cursor h0 (S204). Subsequently, the process returns to S201. In addition, when it is determined that the first post cursor h1 is equal to or less than ½ of the main cursor h0 (S203), the amplitude ratio determination unit 642 adjusts the ISI adjustment circuit 60 to increase the ratio of the first post cursor h1 to the main cursor h0 (S205). Subsequently, the process proceeds to S206.

Third Embodiment

Figure 14:
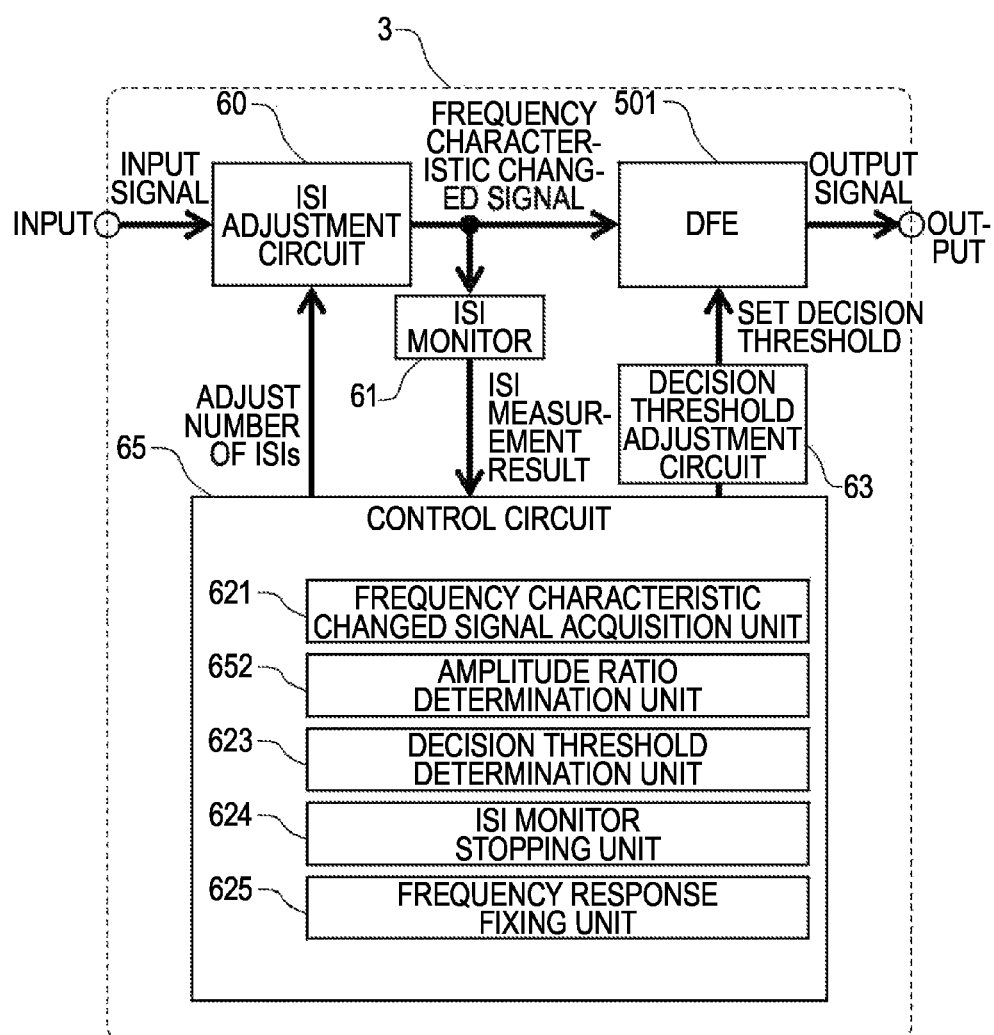
FIG. 14 is a view illustrating a receiver according to a third embodiment.

FIG. 14 is a view illustrating a receiver according to a third embodiment.

The receiver 3 is different from the receiver 1 in that in the receiver 3, a DFE 501 is provided, instead of the DFE 500. Further, the receiver 3 is different from the receiver 1 in that in the receiver 3, a control circuit 65 including an amplitude ratio determination unit 652, instead of the amplitude ratio determination unit 622, is provided. The components of the receiver 3 other than the DFE 501 and the amplitude ratio determination unit 652 have the same configurations and functions as those of the components of the receiver 1 which are denoted by the same reference numerals as used in the receiver 3, detailed descriptions thereof will be omitted.

Figure 15:
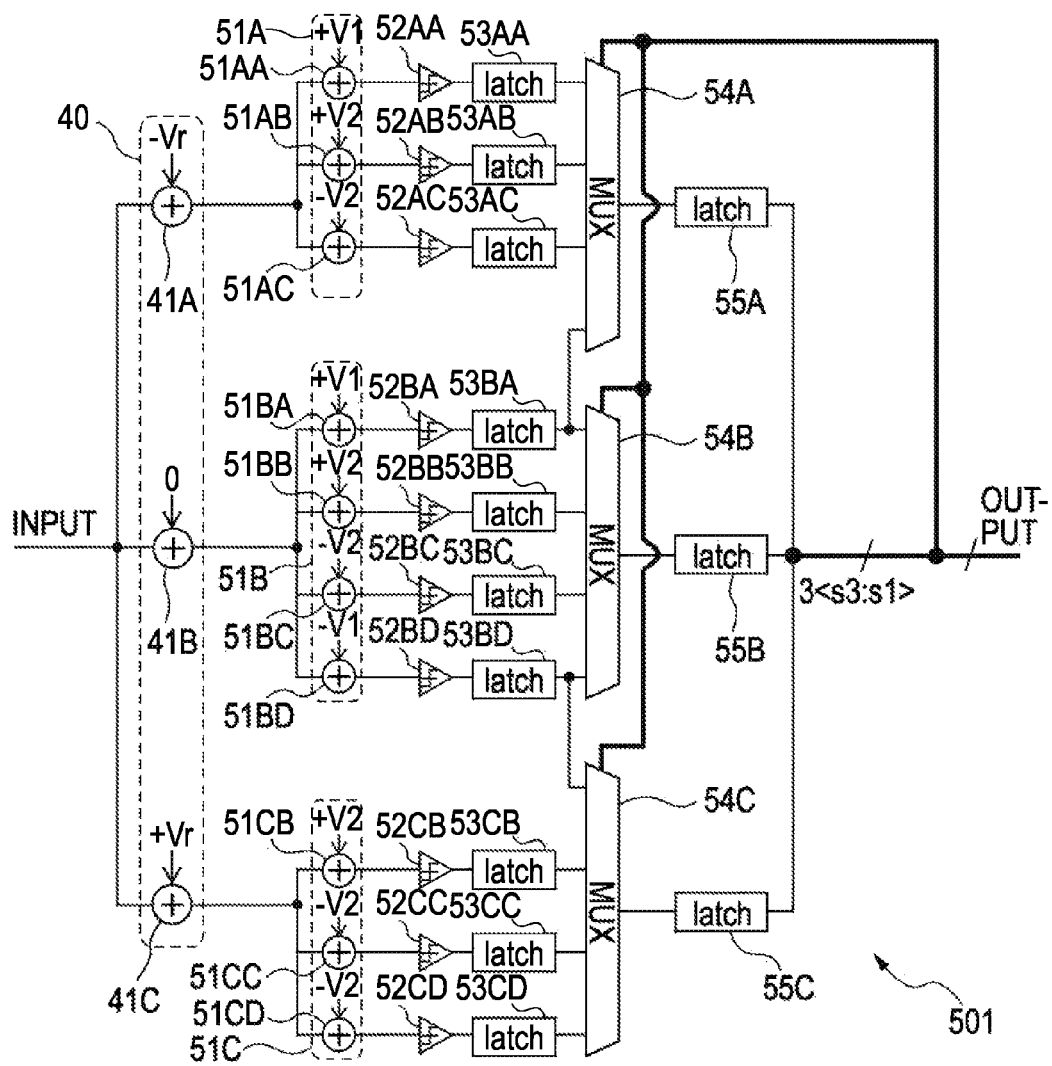
FIG. 15 is an internal circuit block diagram of a DFE illustrated in FIG. 14.

FIG. 15 is an internal circuit block diagram of the DFE 501.

The DFE 501 is different from the DFE illustrated in FIG. 4 in that the DFE 501 does not include the adder circuits 51AD and 51CA, and the comparators 52AD and 52CA, and the first latch circuits 53AD and 53CA. In addition, the DFE 500 is different from the DFE illustrated in FIG. 4 in that in the DFE 500, the second latch circuit 53BA is connected to the MUX 52A, and the second latch circuit 53BC is connected to the MUX 52C. Since the configurations and the functions of the elements of the DFE 501 are identical to those of the elements of the DFE illustrated in FIG. 4 which are denoted by the same reference numerals as those of the DFE 501, detailed descriptions thereof will be omitted.

Figure 16:
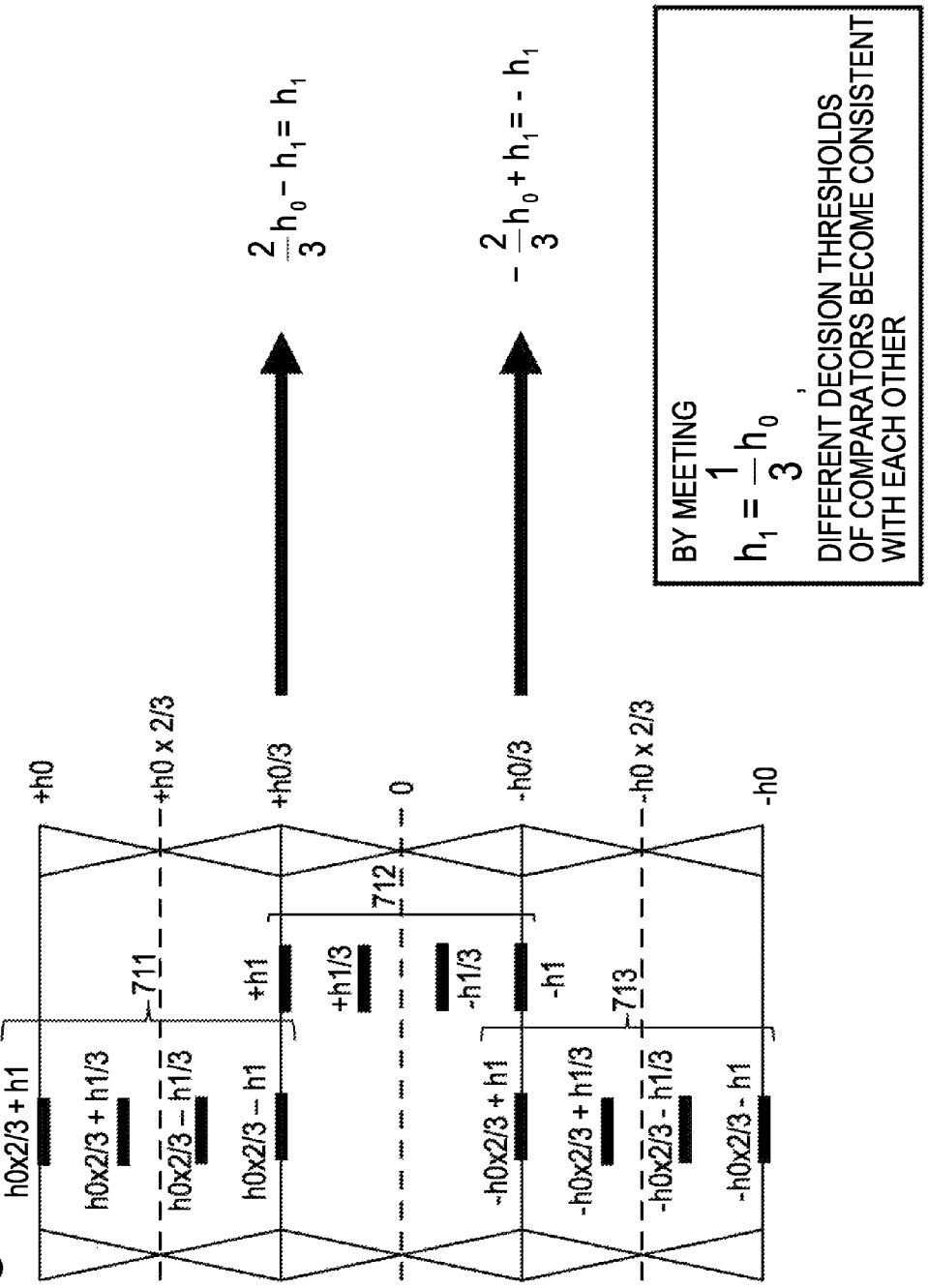
FIG. 16 is a view illustrating a regulation of a main cursor and a first post cursor by a controller illustrated in FIG. 14.

FIG. 16 is a view illustrating an adjustment of the main cursor h0 and the first post cursor h1 by the control circuit 65. In FIG. 16, a first threshold group 711 represents thresholds corresponding to the thresholds of the first level conversion circuit 41A and the first decision feedback equalization correction circuit 51A illustrated in FIG. 4. The second threshold group 712 represents thresholds corresponding to the thresholds of the second level conversion circuit 41B and the second decision feedback equalization correction circuit 51B illustrated in FIG. 4. The third threshold group 713 represents thresholds corresponding to the thresholds of the third level conversion circuit 41C and the third decision feedback equalization correction circuit 51C illustrated in FIG. 4.

The control circuit 65 adjusts the main cursor h0 and the first post cursor h1 such that in the DFE illustrated in FIG. 4, the threshold of the comparator 52AD and the threshold of the comparator 52BA are consistent with each other, and the threshold of the comparator 52BD and the threshold of the comparator 52CA are consistent with each other. The control circuit 65 adjusts the main cursor h0 and the first post cursor h1 to meet $$\frac{2}{3}h_0 - h_1 = h_1$$ [Arithmetic Formula 5]

$$-\frac{2}{3}h_0 + h_1 = -h_1$$

That is, in order to meet $$h_1 = \frac{1}{3}h_0$$ [Arithmetic Formula 6]

the control circuit 65 adjusts the main cursor h0 and the first post cursor h1.

Figure 17:
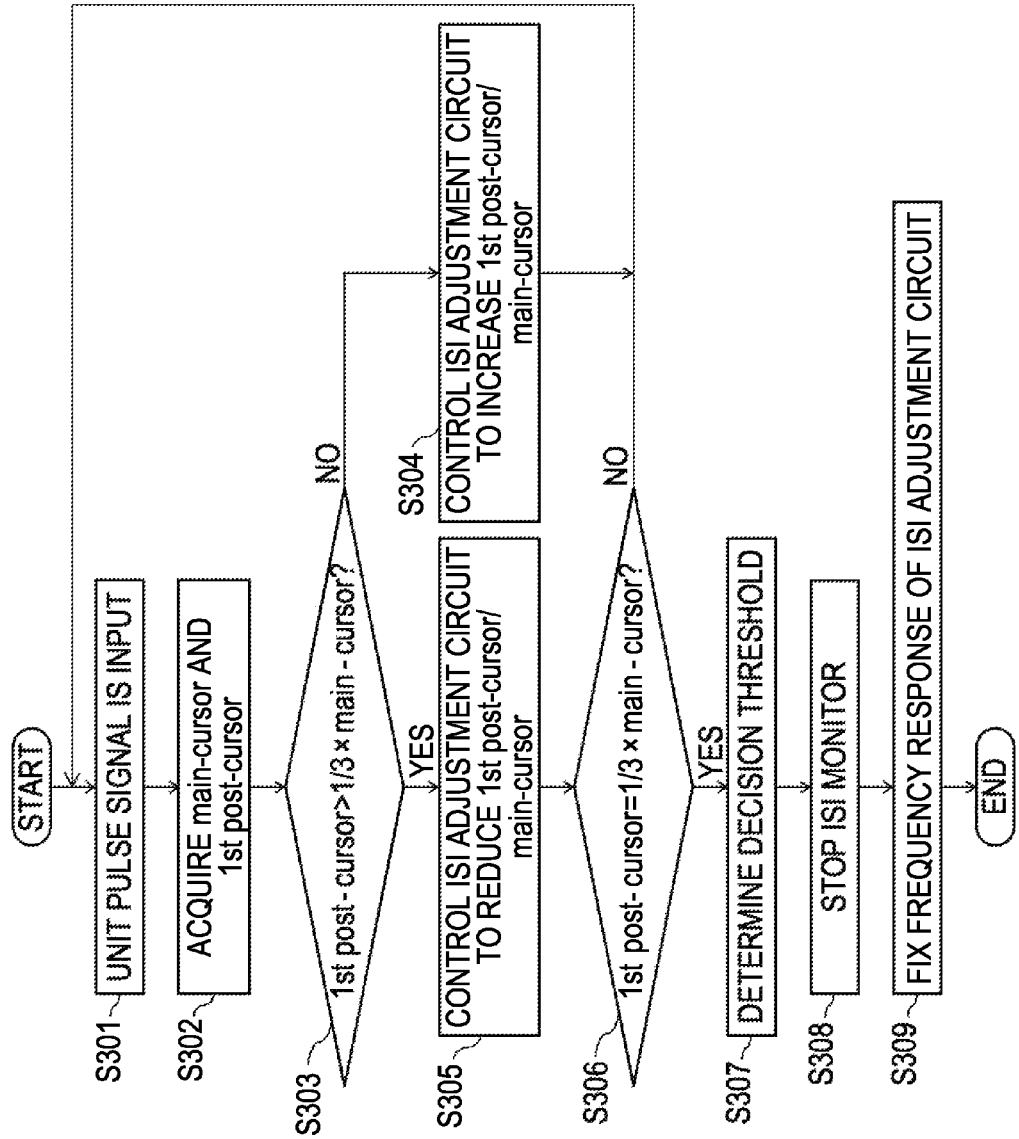
FIG. 17 is a flow chart of an arithmetic processing by the controller illustrated in FIG. 14.

FIG. 17 is a flow chart of an arithmetic processing by the control circuit 65.

Since the processes of S301, S302, S304, S305, and S307 to S309 illustrated in FIG. 17 are identical to the processes of S101, S102, S104, S105, and S107 to S109 illustrated in FIG. 11, detailed descriptions thereof will be omitted.

In S303, the amplitude ratio determination unit 652 determines whether the first post cursor h1 is larger than ⅓ of the main cursor h0. When it is determined by the amplitude ratio determination unit 652 that the first post cursor h1 is equal to or less than ⅓ of the main cursor h0, the process proceeds to S304. In addition, when it is determined by the amplitude ratio determination unit 652 that the first post cursor h1 is larger than ⅓ of the main cursor h0, the process proceeds to S305.

In S306, the amplitude ratio determination unit 652 determines whether the first post cursor h1 and ⅓ of the main cursor h0 are consistent with each other. When it is determined by the amplitude ratio determination unit 652 that the first post cursor h1 and ⅓ of the main cursor h0 are inconsistent with each other, the process returns to S301. In addition, when it is determined by the amplitude ratio determination unit 652 that the first post cursor h1 and ⅓ of the main cursor h0 are consistent with each other, the process proceeds to S307.

Fourth Embodiment

Figure 18:
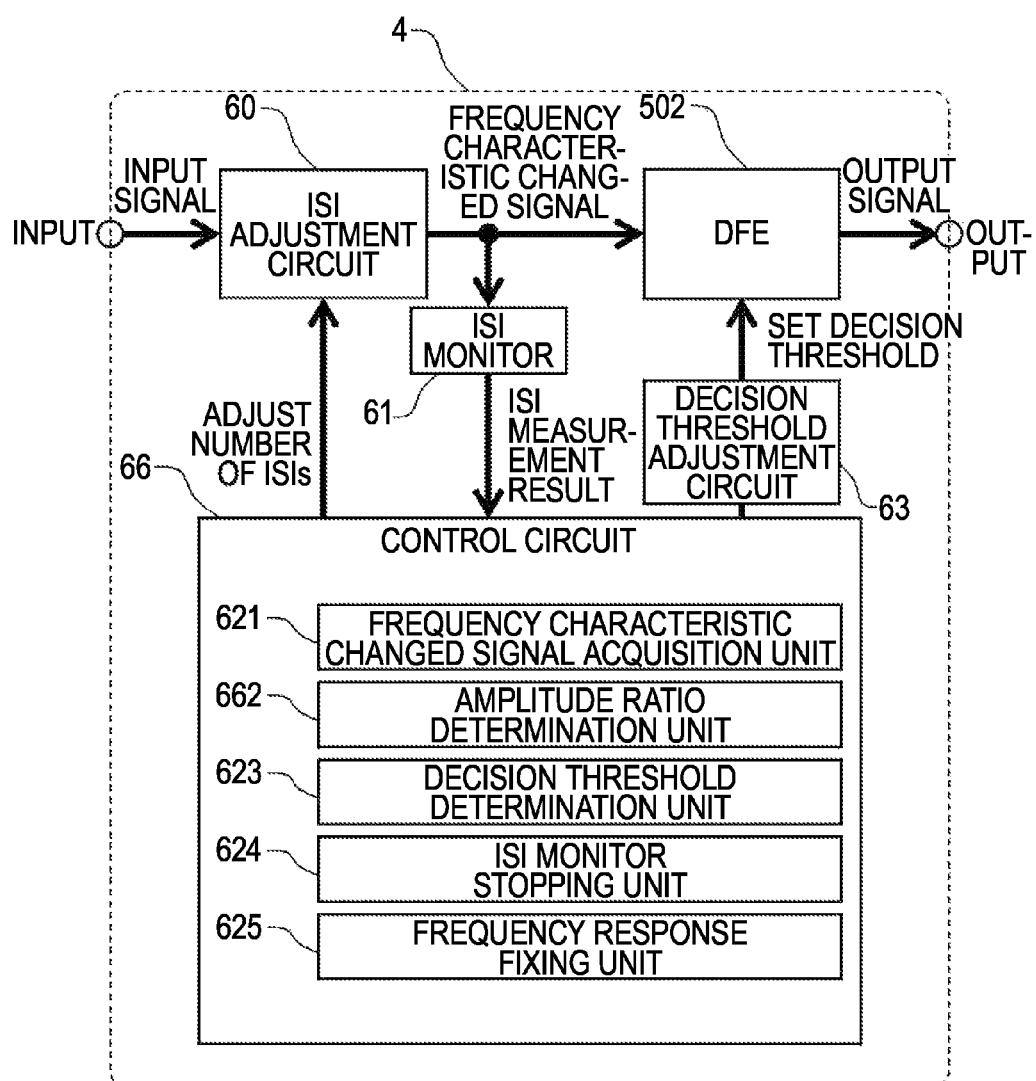
FIG. 18 is a view illustrating a receiver according to a fourth embodiment.

FIG. 18 is a view illustrating a receiver according to a fourth embodiment.

The receiver 4 is different from the receiver 1 in that in the receiver 4, a DFE 502 is provided, instead of the DFE 500. Further, the receiver 4 is different from the receiver 1 in that in the receiver 4, a control circuit 66 including an amplitude ratio determination unit 662, instead of the amplitude ratio determination unit 622, is provided. The components of the receiver 4 other than the DFE 501 and the amplitude ratio determination unit 662 have the same configurations and functions as those of the components of the receiver 1 which are denoted by the same reference numerals as used in the receiver 4, detailed descriptions thereof will be omitted.

Figure 19:
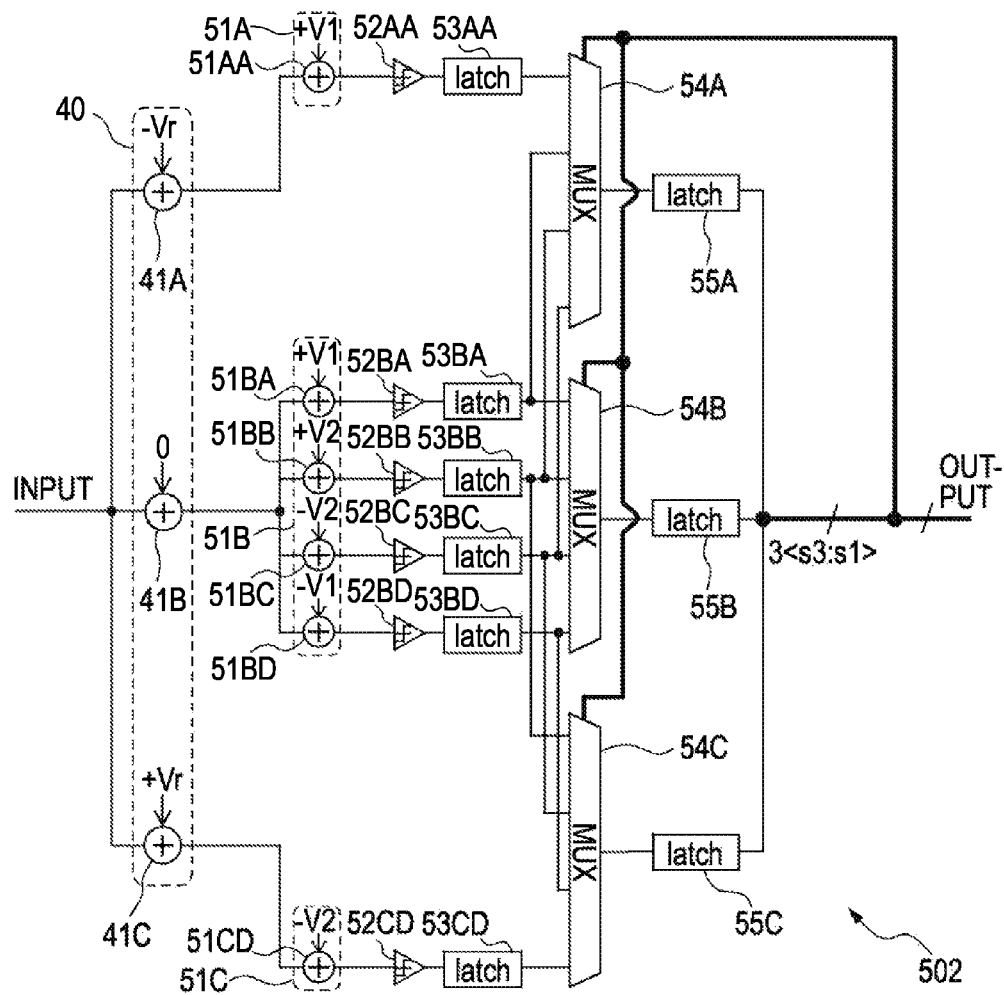
FIG. 19 is an internal circuit block diagram of a DFE illustrated in FIG. 18.

FIG. 19 is an internal circuit block diagram of the DFE 502.

The DFE 502 is different from the DFE illustrated in FIG. 4 in that the DFE 502 does not include the adder circuits 51AB to 51AD, the comparators 52AB and 52AD, and the first latch circuits 53AB and 53AD of the first decision feedback equalization correction circuit 51A. Further, the DFE 502 is different from the DFE illustrated in FIG. 4 in that the DFE 502 does not include the adder circuits 51CA and 51CC, and the comparators 52CA and 52CC, and the first latch circuits 53CA and 53CC of the third decision feedback equalization correction circuit 51C. Further, the DFE 502 is different from the DFE illustrated in FIG. 4 in that in the DFE 502, the second latch circuits 53BA to 53BC are connected to the MUX 52A, and the second latch circuits 53BB to 53BD are connected to the MUX 52C. Since the configurations and the functions of the elements of the DFE 502 are the same as those of the elements of the DFE illustrated in FIG. 4, detailed descriptions thereof will be omitted.

Figure 20:
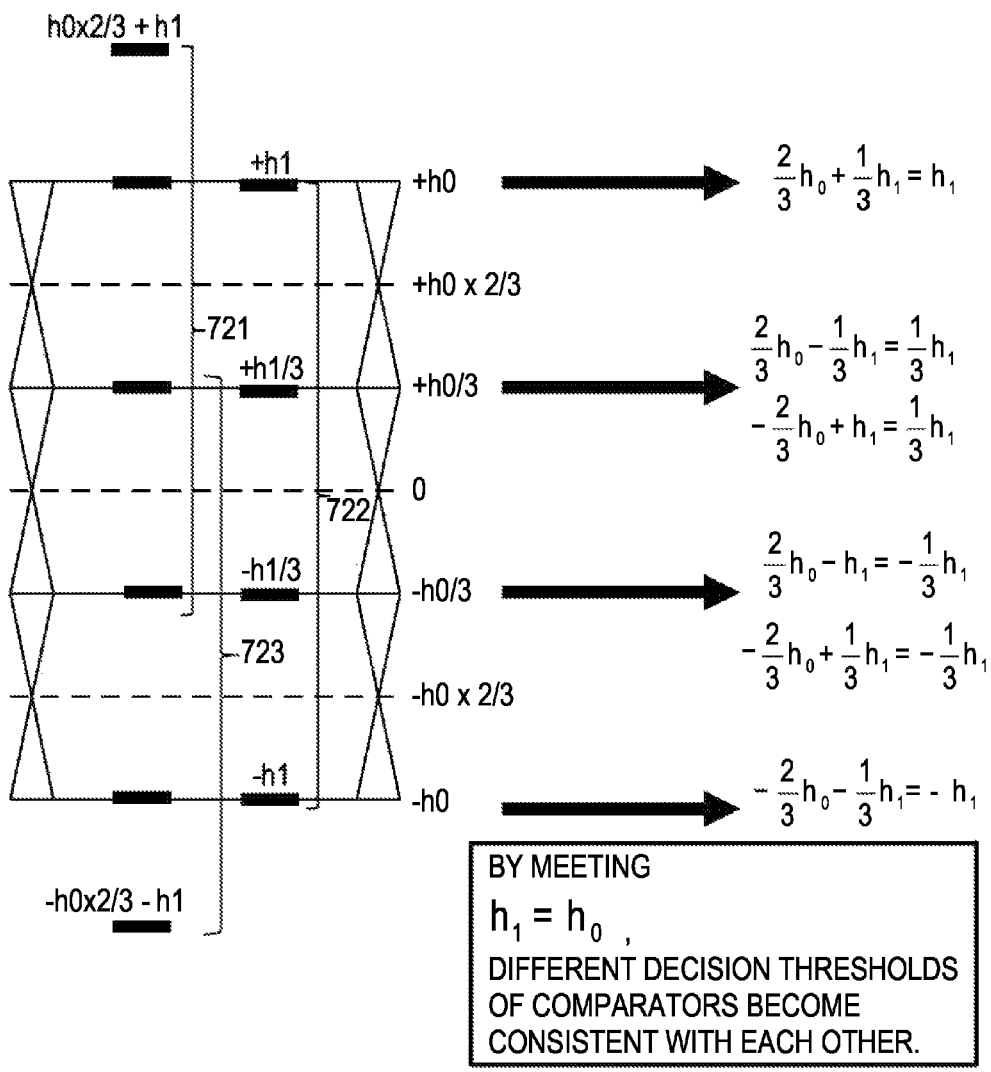
FIG. 20 is a view illustrating an adjustment of a main cursor and a first post cursor by a controller illustrated in FIG. 18.

FIG. 20 is a view illustrating an adjustment of the main cursor h0 and the first post cursor h1 by the control circuit 66. In FIG. 20, a first threshold group 721 represents thresholds corresponding to the thresholds of the first level conversion circuit 41A and the first decision feedback equalization correction circuit 51A illustrated in FIG. 4. A second threshold group 722 represents thresholds corresponding to the thresholds of the second level conversion circuit 41B and the second decision feedback equalization correction circuit 51B illustrated in FIG. 4. A third threshold group 723 represents thresholds corresponding to the thresholds of the third level conversion circuit 41C and the third decision feedback equalization correction circuit 51C illustrated in FIG. 4.

The control circuit 66 adjusts the main cursor h0 and the first post cursor h1 such that the threshold of the comparator 52AB and the threshold of the comparator 52BA are consistent with each other, the threshold of the comparator 52AC and the threshold of the comparator 52BB are consistent with each other, and the threshold of the comparator 52AD and the threshold of the comparator 52BC are consistent with each other. Further, the control circuit 62 adjusts the main cursor h0 and the first post cursor h1 such that the threshold of the comparator 52BB and the threshold of the comparator 52CA are consistent with each other, the threshold of the comparator 52BC and the threshold of the comparator 52CB are consistent with each other, and the threshold of the comparator 52BD and the threshold of the comparator 52CC are consistent with each other. The control circuit 62 adjusts the main cursor h0 and the first post cursor h1 to meet $$\frac{2}{3}h_0 + \frac{1}{3}h_1 = h_1$$ [Arithmetic Formula 7]

$$\frac{2}{3}h_0 - \frac{1}{3}h_1 = \frac{1}{3}h_1$$

$$\frac{2}{3}h_0 - h_1 = -\frac{1}{3}h_1$$

$$-\frac{2}{3}h_0 + h_1 = \frac{1}{3}h_1$$

$$-\frac{2}{3}h_0 + \frac{1}{3}h_1 = -\frac{1}{3}h_1$$

$$-\frac{2}{3}h_0 - \frac{1}{3}h_1 = -h_1$$

That is, in order to meet $$h_1 = h_0$$ [Arithmetic Formula 8]

the control circuit 65 adjusts the main cursor h0 and the first post cursor h1.

Figure 21:
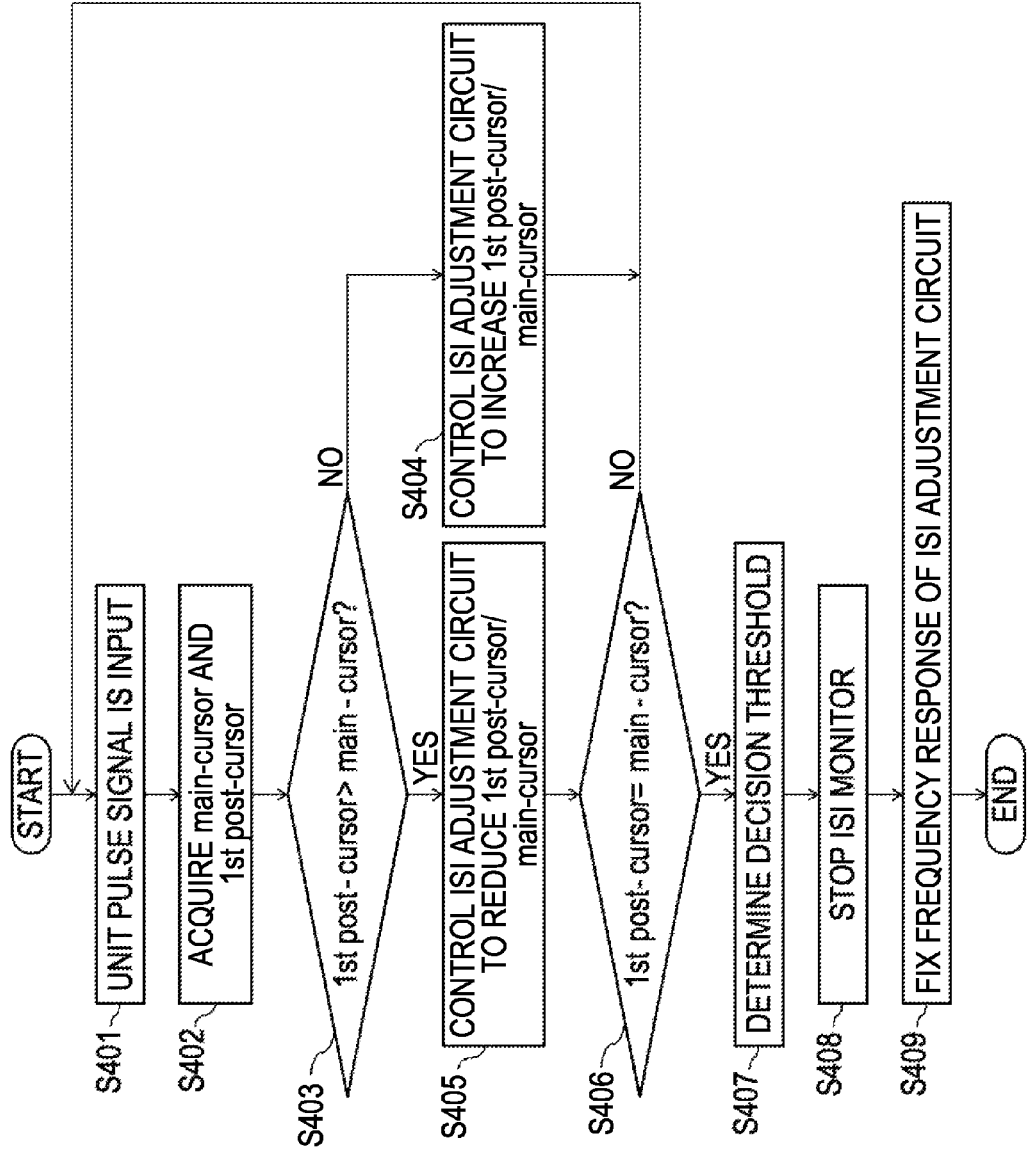
FIG. 21 is a flow chart of an arithmetic processing by the controller illustrated in FIG. 18.

FIG. 21 is a flow chart of an arithmetic processing by the control circuit 66.

Since the processes of S401, S402, S404, S405, and S407 to S409 illustrated in FIG. 21 are identical to the processes of S101, S102, S104, S105, and S107 to S109 illustrated in FIG. 11, detailed descriptions thereof will be omitted.

In S403, the amplitude ratio determination unit 662 determines whether the first post cursor h1 is larger than the main cursor h0. When it is determined by the amplitude ratio determination unit 662 that the first post cursor h1 is equal to or less than the main cursor h0, the process proceeds to S404. In addition, when it is determined by the amplitude ratio determination unit 662 that the first post cursor h1 is larger than the main cursor h0, the process proceeds to S405.

In S406, the amplitude ratio determination unit 662 determines whether the main cursor h0 and the first post cursor h1 are consistent with each other. When it is determined by the amplitude ratio determination unit 662 that the main cursor h0 and the first post cursor h1 are inconsistent with each other, the process returns to S401. In addition, when it is determined by the amplitude ratio determination unit 662 that the main cursor h0 and the first post cursor h1 are consistent with each other, the process proceeds to S407.

Fifth Embodiment

Figure 22A:
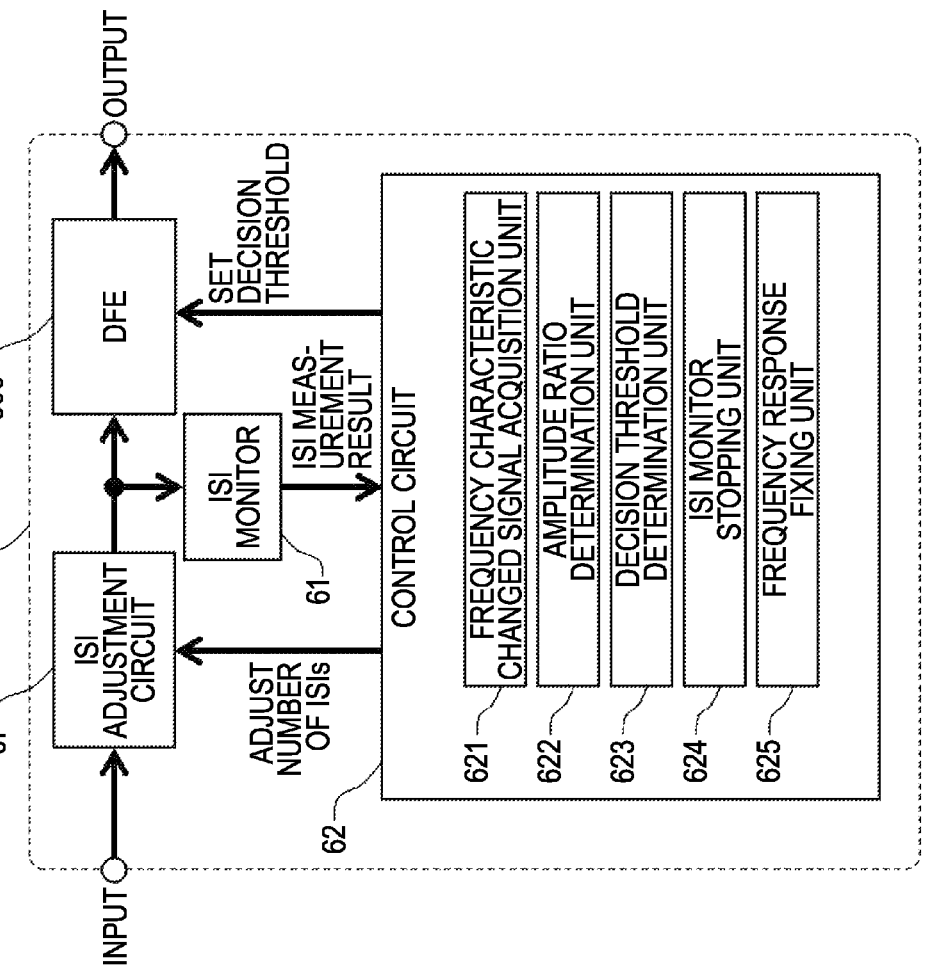
FIG. 22A is a view illustrating a receiver according to a fifth embodiment.
Figure 22B:
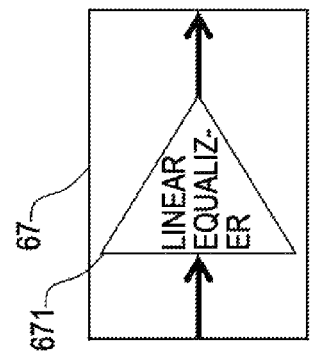
FIG. 22B is an internal circuit diagram of an ISI adjustment circuit.

FIG. 22A is a view illustrating a receiver according to a fifth embodiment, and FIG. 22B is an internal circuit diagram of an ISI adjustment circuit of FIG. 22A.

The receiver 5 is different from the receiver 1 in that in the receiver 5, an ISI adjustment circuit 67 is provided, instead of the ISI adjustment circuit 60. The components of the receiver 5 other than the ISI adjustment circuit 67 have the same configurations and functions as those of the components of the receiver 1 which are denoted by the same reference numerals as used in the receiver 5, detailed descriptions thereof will be omitted.

The ISI adjustment circuit 67 includes a linear equalizer 671. In the receiver 5, the frequency characteristic of the linear equalizer 671 is changed by the control circuit 62 so that the main cursor h0 and the first post cursor h1 of the signal input to the DFE 500 may be adjusted.

Sixth Embodiment

Figure 23:
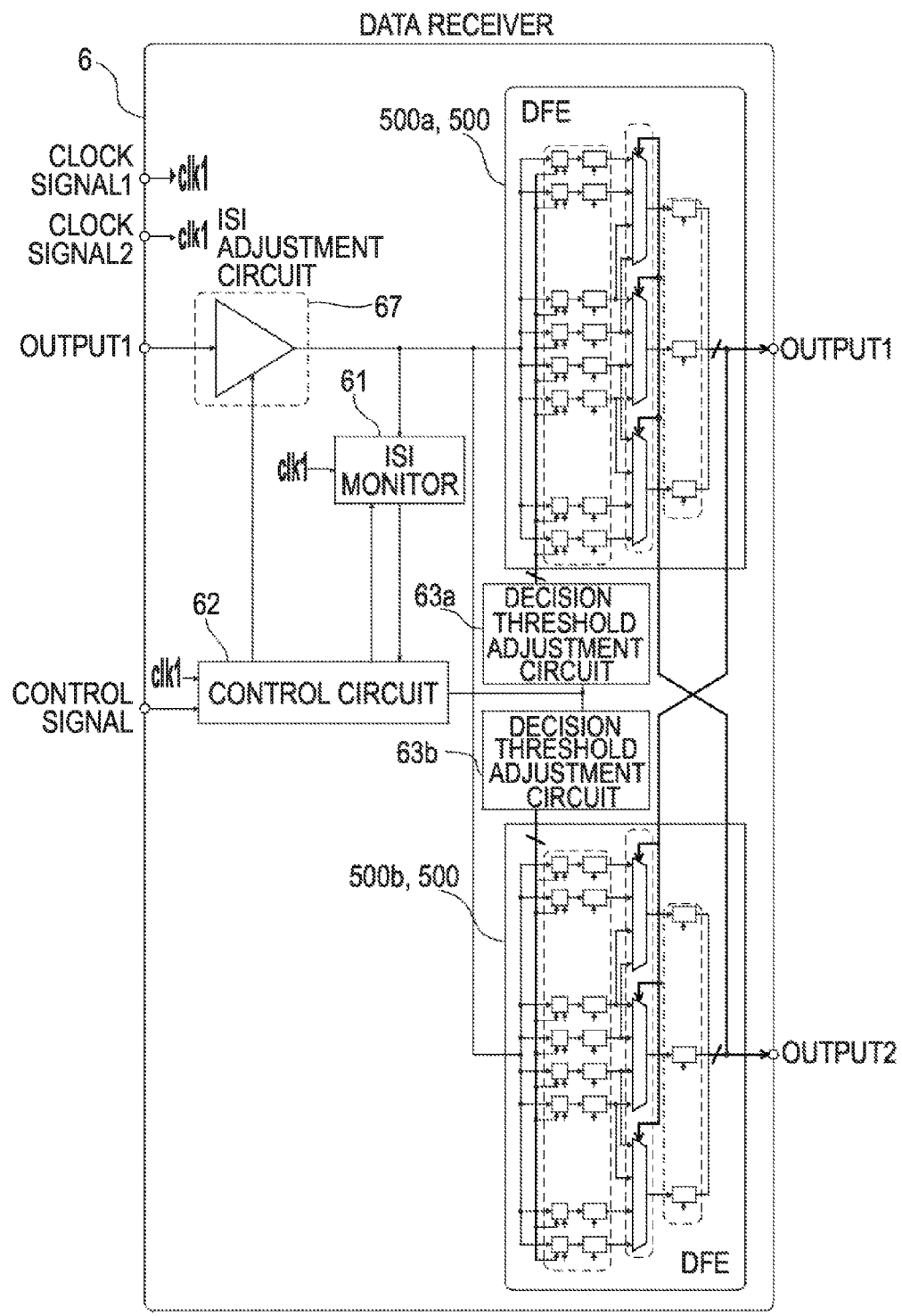
FIG. 23 is a view illustrating a receiver according to a sixth embodiment.

FIG. 23 is a view illustrating a receiver according to a sixth embodiment.

The receiver 6 is different from the receiver 1 in that in the receiver 6, DFEs 500a and 500b and decision threshold adjustment circuits 63a and 63b are provided, instead of the DFE 500 and the decision threshold adjustment circuit 63. The DFEs 500a and 500b have the same functions and configurations as those of the DFE 500, and the decision threshold adjustment circuits 63a and 63b have the same functions and configurations as those of the decision threshold adjustment circuit 63. Since the components of the receiver 6 other than the DFEs 500a and 500b and the decision threshold adjustment circuits 63a and 63b have the same configurations and functions as those of the components of the receiver 1 which are denoted by the same reference numerals as used in the receiver 6, detailed descriptions thereof will be omitted.

The DFE 500a and the decision threshold adjustment circuit 63a operate in an identical clock, and the DFE 500b and the decision threshold adjustment circuit 63b operate in a clock having the same cycle as but a phase different by half cycle from that of the clock for operating the DFE 500a and the decision threshold adjustment circuit 63a.

The receiver 6 operates the DFE 500a and the decision threshold adjustment circuit 63a, and the DFE 500b and the decision threshold adjustment circuit 63b at a half rate so that a time interleaving operation is implemented, and a timing condition for operating the DFEs is mitigated.

Seventh Embodiment

Figure 24:
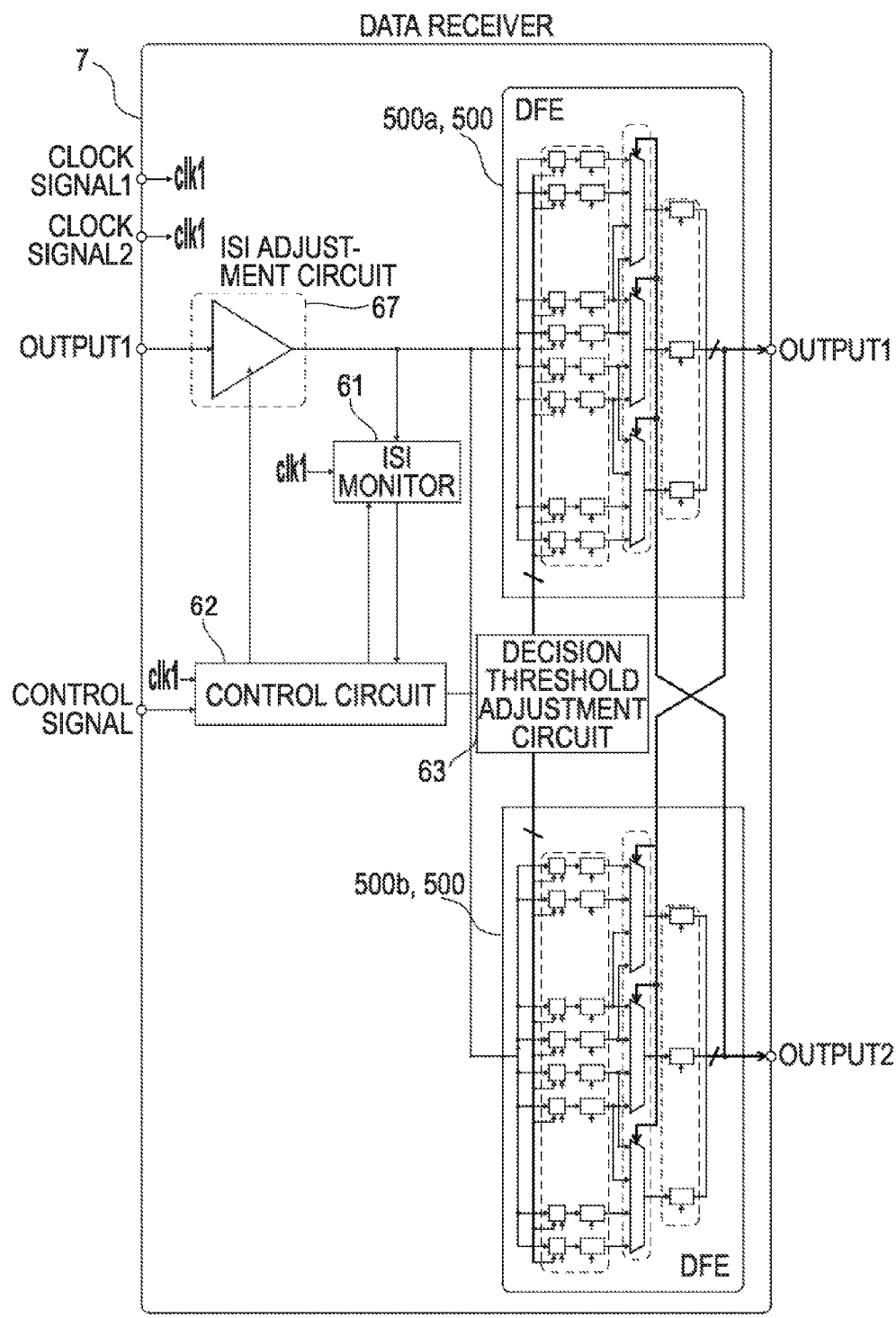
FIG. 24 is a view illustrating a receiver according to a seventh embodiment.

FIG. 24 is a view illustrating a receiver according to a seventh embodiment.

The receiver 7 is different from the receiver 6 in that in the receiver 7, the decision threshold adjustment circuit 63 is provided as in the receiver 1, instead of the decision threshold adjustment circuits 63a and 63b. The components of the receiver 7 other than the decision threshold adjustment circuit 63 have the same configurations and functions as those of the components of the receiver 6 which are denoted by the same reference numerals as used in the receiver 6, detailed descriptions thereof will be omitted.

In the receiver 7, the decision threshold adjustment circuit 63 is provided, instead of the decision threshold adjustment circuits 63a and 63b, so as to implement a common decision threshold adjustment circuit, and therefore, the entire circuit scale may be smaller than the receiver 6.

Eighth Embodiment

Figure 25:
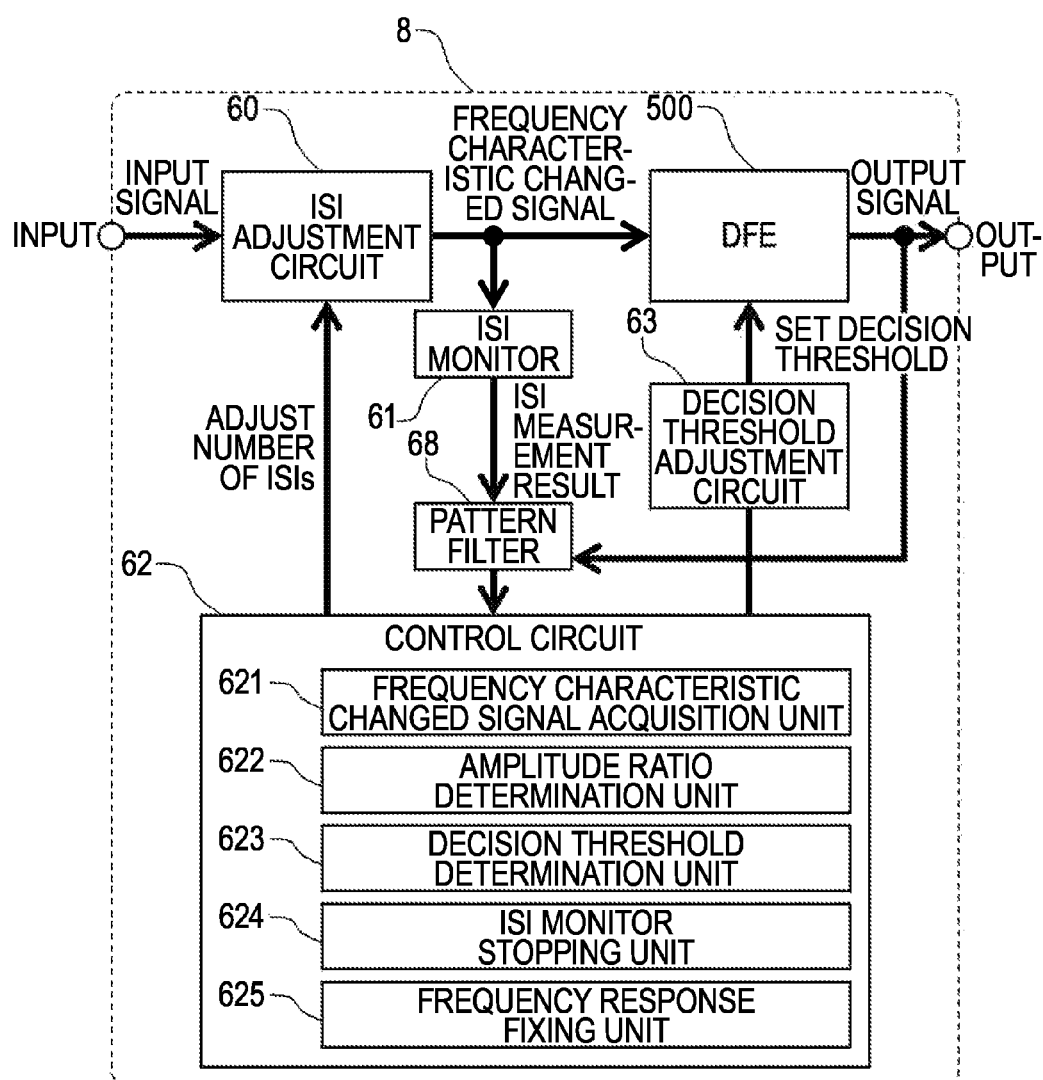
FIG. 25 is a view illustrating a receiver according to an eighth embodiment.

FIG. 25 is a view illustrating a receiver according to an eighth embodiment.

The receiver 8 is different from the receiver 1 in that in the receiver 8, a pattern filter 68 is provided between the ISI monitor 61 and the control circuit 62. Since the components of the receiver 8 other than the pattern filter 68 have the same configurations and functions as those of the components of the receiver 1 which are denoted by the same reference numerals as used in the receiver 8, detailed descriptions thereof will be omitted.

A waveform signal representing the waveform of the frequency characteristic changed signal measured by the ISI monitor 61 and the output signal of the DFE 500 are input to the pattern filter 68. When it is determined that the output signal of the DFE 500 is a unit pulse signal, the pattern filter 68 outputs the waveform signal input from the ISI monitor 61, to the control circuit 69.

Figure 26:
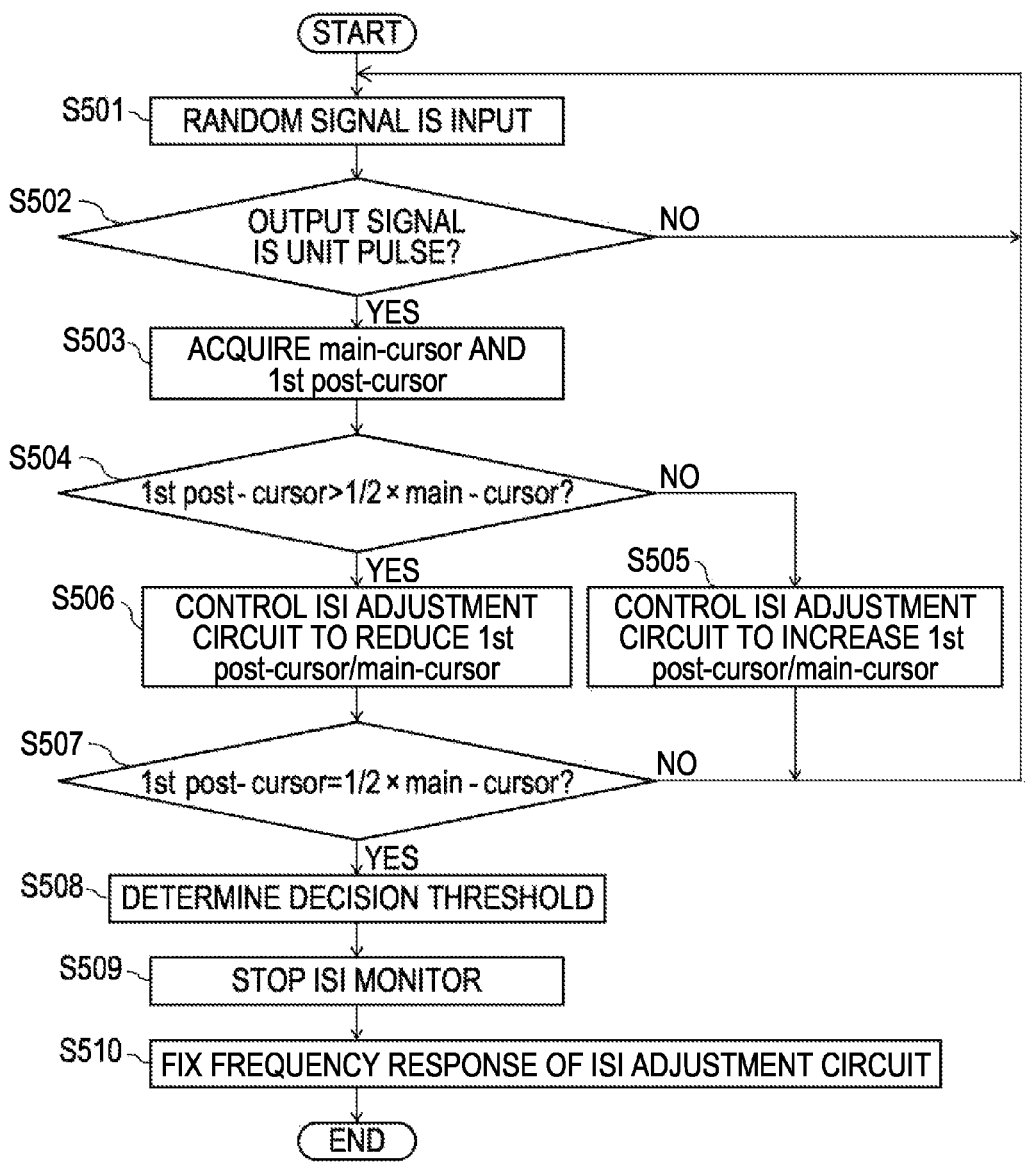
FIG. 26 is a flow chart of an arithmetic processing by a pattern filter and a controller illustrated in FIG. 25.

FIG. 26 is a flow chart of an arithmetic processing by the pattern filter 68 and the control circuit 69.

First, a random signal such as a pseudo-random bit sequence (PRBS) signal and a signal at the actual data communication time, other than a specific training signal, is input to the ISI adjustment circuit 60 from an external device (not illustrated) (S501). The pattern filter 68 determines whether the output signal of the DFE 500 is a unit pulse signal (S502). The process of S502 is repeated until the pattern filter 68 determines that the output signal of the DFE 500 is a unit pulse signal (S502). When the pattern filter 68 determines that the output signal of the DFE 500 is a unit pulse signal (S502), the process proceeds to S503. In S503, the frequency characteristic changed signal acquisition unit 621 acquires the main cursor h0 and the first post cursor h1, through the ISI monitor 61 and the pattern filter 68, when the unit pulse signal is input. Since the processes of S504 to S510 illustrated in FIG. 26 are performed in the same manner as that of S103 to S109 illustrated in FIG. 11, detailed descriptions thereof will be omitted.

Since the receiver 8 includes the pattern filter 68 determining whether the output signal of the DFE 500 is a unit pulse signal, the receiver 8 may adjust the main cursor h0 and the first post cursor h1 from a random signal such as a unit pulse signal, other than a training signal.

Modifications of Receivers According to Embodiments

While a 4-level modulated signal in which a 4-level data value is pulse-amplitude-modulated, which is called PAM4, is input to each of the receivers 1 to 8, a N (N: an integer of 4 or more)-level modulation signal in which a 4- or more level data value is pulse-amplitude-modulated may be input to the receivers according to the embodiments. For example, an input signal in which an 8-level data value is pulse-amplitude-modulated, as may be called PAM8, may be input to the receivers according to the embodiments.

Figure 27:
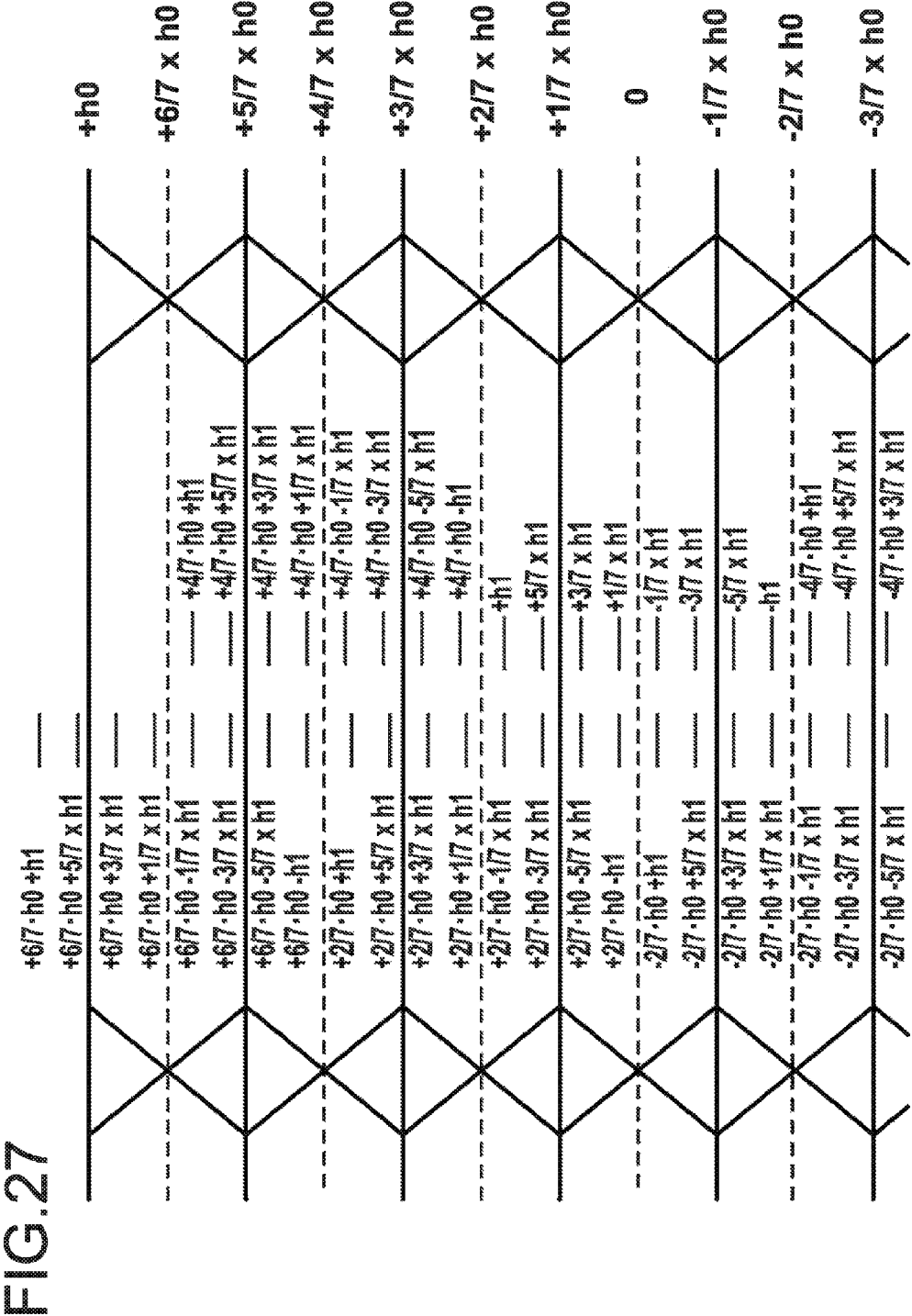
FIG. 27 is a first view illustrating an adjustment of a main cursor and a first post cursor when an 8-level modulation signal is input.
Figure 28:
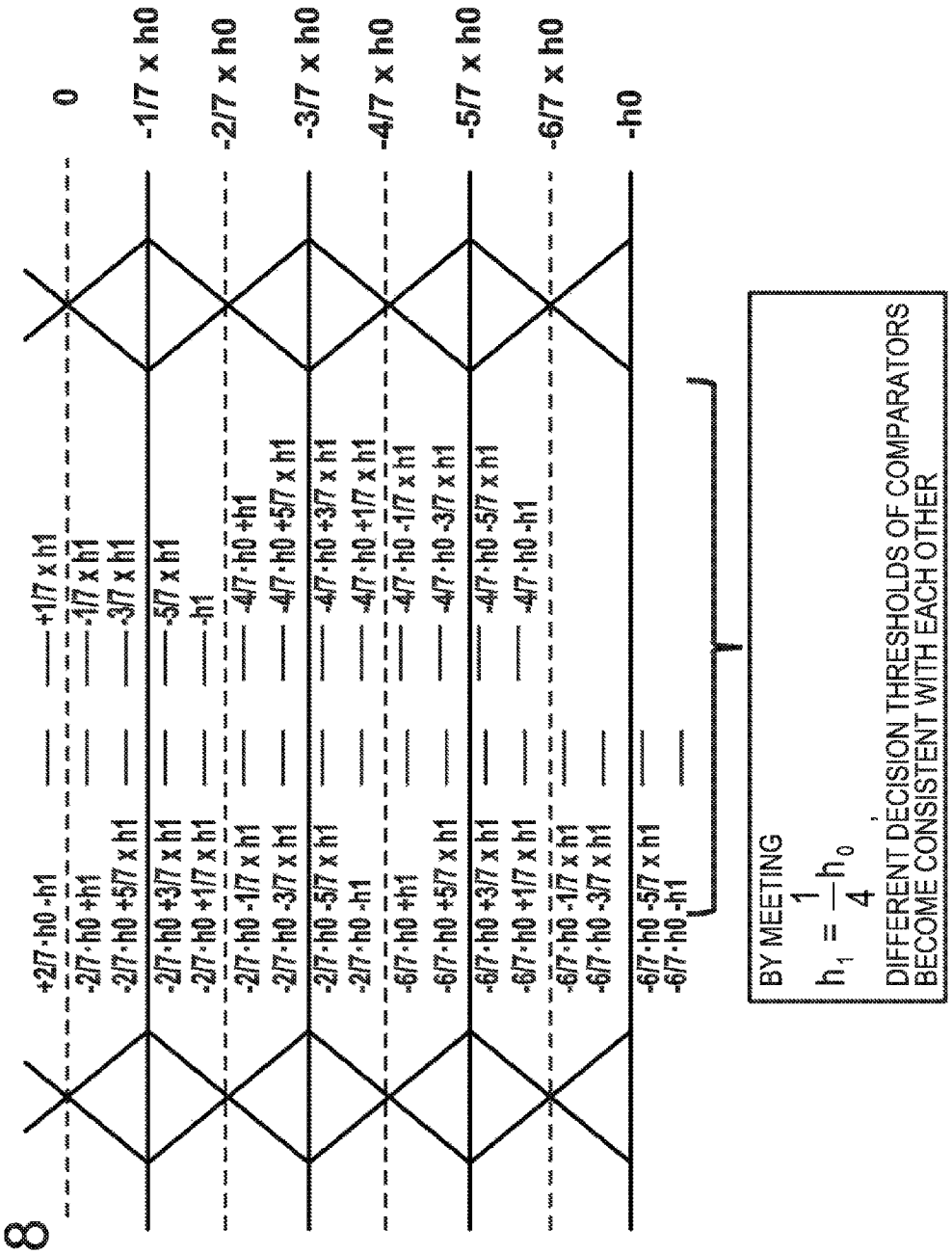
FIG. 28 is a second view illustrating an adjustment of the main cursor and the first post cursor when an 8-level modulation signal is input.

FIG. 27 is a first view illustrating an adjustment of the main cursor h0 and the first post cursor h1 when an 8-level modulated signal in which an 8-level data value is pulse-amplitude-modulated is input. FIG. 28 is a second view illustrating an adjustment of the main cursor h0 and the first post cursor h1 when an 88-level modulated signal is input. FIG. 27 represents +h0[V] to −3/7×h0[V], and FIG. 28 represents 0[V] to −h0[V]. In the examples illustrated in FIGS. 27 and 28, the main cursor h0 and the first post cursor h1 are adjusted to meet $$h_1 = \frac{1}{4}h_0$$ [Arithmetic Formula 9]

so that the number of the adder circuits, the comparison circuits, and the latch circuits included in the speculative DFE may be reduced.

Figure 29:
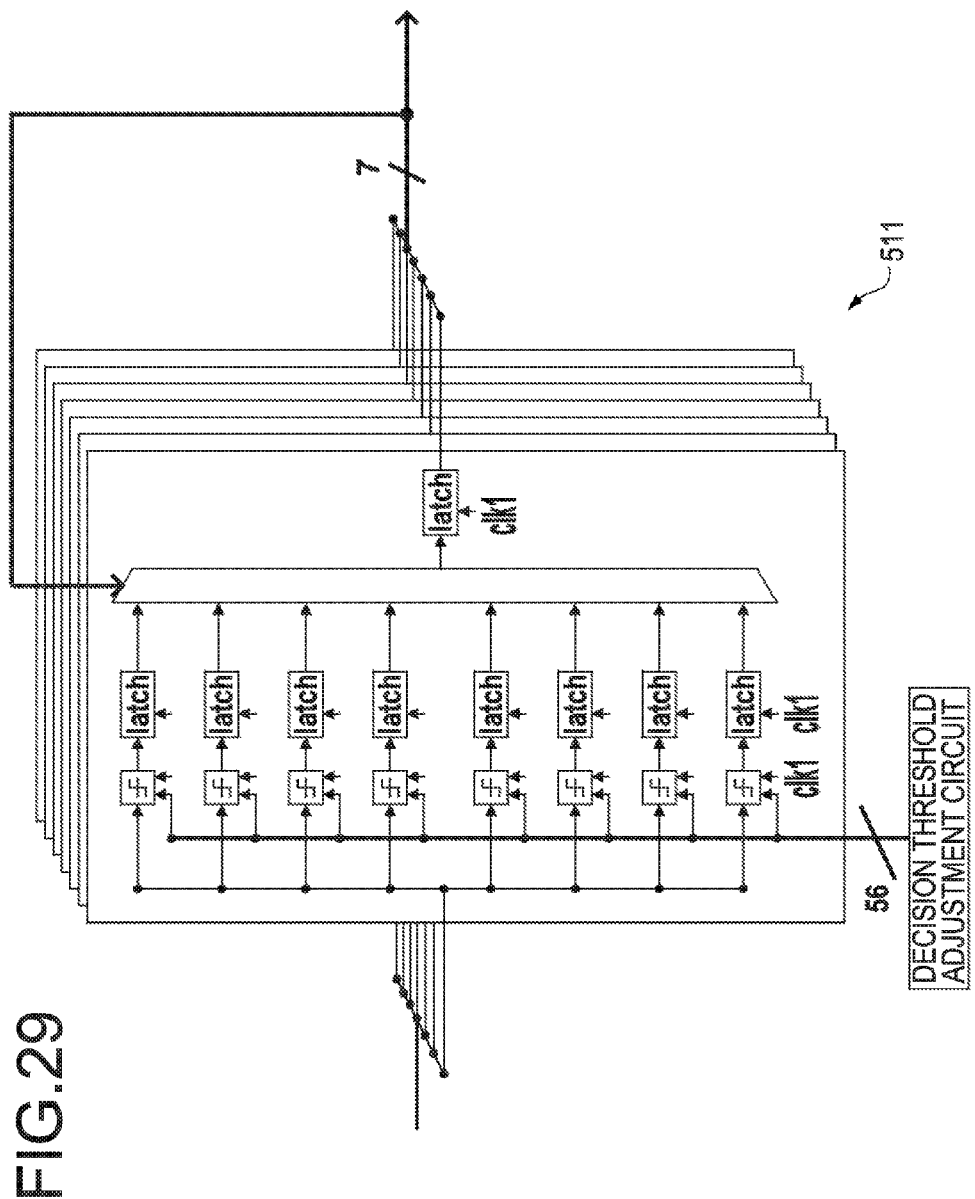
FIG. 29 is a schematic circuit diagram of a DFE when the number of adder circuits, comparison circuits, and latch circuits included in a speculative DFE is not reduced, in the 8-level modulation.
Figure 30:
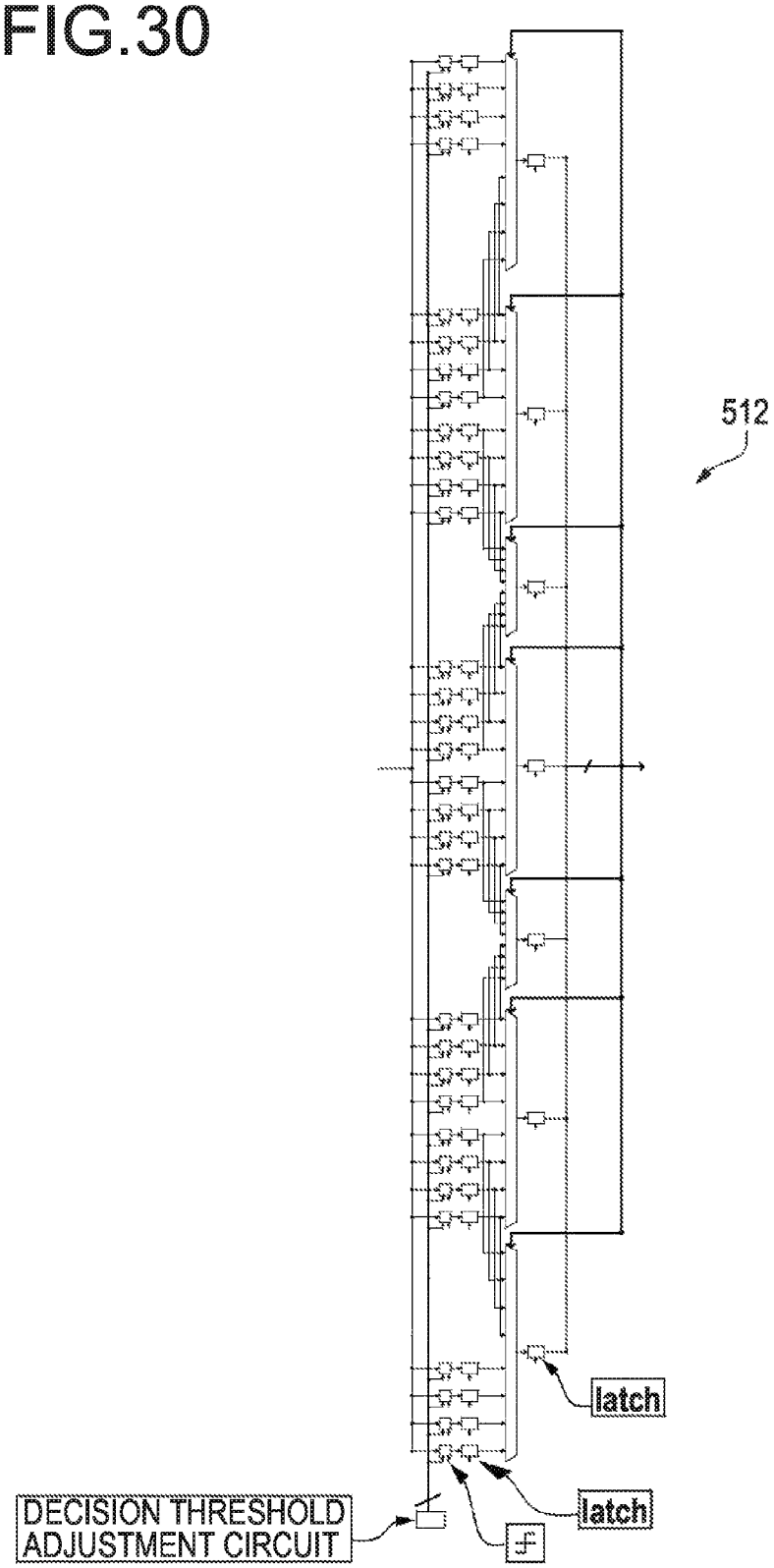
FIG. 30 is a schematic circuit diagram of a DFE when the number of adder circuits, comparison circuits, and latch circuits included in a speculative DFE is reduced by using adjusting the main cursor and the first post cursor as illustrated in FIGS. 27 and 28, in the 8-level modulation.

FIG. 29 is a schematic circuit diagram of a DFE when the number of the adder circuits, the comparison circuits, and the latch circuits included in the speculative DFE is not reduced. FIG. 30 is a schematic circuit diagram of a DFE when the number of the adder circuits, the comparison circuits, and the latch circuits included in the speculative DFE is reduced by adjusting the main cursor h0 and the first post cursor h1 as illustrated in FIGS. 27 and 28.

In the PAM8, since seven thresholds and an 8-level data value are provided, the DFE 511 has 56 (=7×8) adder circuits, comparison circuits, and latch circuits when the main cursor h0 and the first post cursor h1 are not adjusted. Meanwhile, when the main cursor h0 and the first post cursor h1 are adjusted, the DFE 512 has 32 (4×8) adder circuits, comparison circuits, and latch circuits. The DFE 512 may reduce the number of the adder circuits, the comparison circuits, and the latch circuits, as compared to the DFE 511, by adjusting the main cursor h0 and the first post cursor h1 as illustrated in FIGS. 27 and 28.

In addition, for the functions of the control circuits 62, 64, 65, and 66 in the above-described embodiments, for example, programs stored in a memory (not illustrated) within each control circuit may be executed by a processor (e.g., a CPU). The processor may be any one of, for example, a CPU, a micro processing unit (MPU), a digital signal processor (DSP), an application specific integrated circuit (ASIC), a programmable logic device (PLD), and a field programmable gate array (FPGA).

In addition, all the above-described embodiments are merely exemplary embodiments for implementing the present disclosure, and the technological scope of the present disclosure should not be construed as being limited to the embodiments. That is, the present disclosure may be variously modified without departing from the technological concept or gist thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A receiver comprising:
    a frequency characteristic changing circuit configured to change a frequency characteristic of an input signal in which N-level data value is pulse-amplitude-modulated, to generate a frequency characteristic changed signal, wherein the N is an integer of 4 or more;
    a controller configured to include at least a processor configured to control the frequency characteristic changing circuit to obtain a desired ratio between a first amplitude component of a target data value corresponding to the frequency characteristic changed signal at a first timing and a second amplitude component of the target data value at a second timing which is later than the first timing; and
    a first decision feedback equalization circuit to which the frequency characteristic changed signal is input, wherein the first decision feedback equalization circuit includes:
a first comparison circuit configured to include a plurality of first comparators each to output a first comparison result obtained from comparing the target data value and a threshold value, and
first N−1 selection circuits each configured to select one of first comparison results output from the plurality of first comparators at the second timing, based on the first comparison results, and
wherein at least one of the plurality of first comparators outputs the first comparison results to two of the first N−1 selection circuits.

2. The receiver according to claim 1,
wherein the processor
acquires the first amplitude component and the second amplitude component when a unit pulse signal is input as the input signal;
determines whether the ratio of the second amplitude component to the first amplitude component is the desired ratio; and
fixes a frequency response of the frequency characteristic changing circuit when it is determined that the ratio of the first amplitude component and the second amplitude component is the desired ratio.

3. The receiver according to claim 2,
wherein the input signal is a 4-level modulated signal in which a 4-level data value is pulse-amplitude-modulated, and
wherein the processor determines that the ratio of the second amplitude component to the first amplitude component is the desired ratio, when the second amplitude component is ½ of the first amplitude component.

4. The receiver according to claim 2,
wherein the input signal is a 4-level modulated signal in which a 4-level data value is pulse-amplitude-modulated, and
wherein the processor determines that the ratio of the second amplitude component to the first amplitude component is the desired ratio, when the second amplitude component is ⅓ of the first amplitude component.

5. The receiver according to claim 2,
wherein the input signal is a 4-level modulated signal in which a 4-level data value is pulse-amplitude-modulated, and
wherein the processor determines that the ratio of the second amplitude component to the first amplitude component is the desired ratio, when the second amplitude component is identical to the first amplitude component.

6. The receiver according to claim 2,
wherein the input signal is a 8-level modulated signal in which an 8-level data value is pulse-amplitude-modulated, and
wherein the processor determines that the ratio of the second amplitude component to the first amplitude component is the desired ratio, when the second amplitude component is ¼ of the first amplitude component.

7. The receiver according to claim 1,
wherein the frequency characteristic changing circuit includes a linear equalizer.

8. The receiver according to claim 1, further comprising:
a second decision feedback equalization circuit coupled in parallel to the first decision feedback equalization circuit, and to which the frequency characteristic changed signal is input,
wherein the second decision feedback equalization circuit includes:
a second comparison circuit including a plurality of second comparators each to output a second comparison result obtained from comparing the target data value and a threshold value, and
second N−1 second selection circuits configured to select one of second comparison results output from the plurality of second comparators at the second timing based on the second comparison results, and
wherein at least one of the plurality of second comparators outputs the second comparison results to two of the N−1 selection circuits.

9. The receiver according to claim 1, further comprising:
a pattern filter configured to supply the frequency characteristic changed signal to the controller from the frequency characteristic changing circuit, when it is determined that the input signal is a predetermined pattern.

10. A control method for a receiver to which a unit pulse signal is input as an input signal, the control method comprising:
changing a frequency characteristic of the input signal to generate a frequency characteristic changed signal;
acquiring a first amplitude component of a target data value corresponding to the frequency characteristic changed signal at a first timing and a second amplitude component of the target data value at a second timing which is later than the first timing;
determining whether a ratio of the second amplitude component to the first amplitude component is a desired ratio; and
fixing a frequency response for generating the frequency characteristic changed signal when it is determined that the ratio of the second amplitude component to the first amplitude component is the desired ratio.

* * * * *